United States Patent
Fritze et al.

(10) Patent No.: US 6,329,313 B1
(45) Date of Patent: *Dec. 11, 2001

(54) COVALENTLY SUPPORTED CHEMICAL COMPOUND WHICH CAN BE NEUTRAL OR IONIC IN THE CLAIMS

(75) Inventors: Cornelia Fritze, Frankfurt; Frank Küber, Oberursel; Hans Bohnen, Niedernhausen, all of (DE)

(73) Assignee: Basell Polyolefine GmbH (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/907,938

(22) Filed: Aug. 12, 1997

(30) Foreign Application Priority Data

Aug. 13, 1996 (DE) .............................. 196 32 558
Aug. 13, 1996 (DE) .............................. 196 32 557
Nov. 14, 1996 (DE) .............................. 196 47 070

(51) Int. Cl.$^7$ ............................................ B01J 21/02
(52) U.S. Cl. .................. 502/202; 502/103; 502/118; 502/232; 556/7; 556/8; 556/11; 556/14; 568/1; 568/3
(58) Field of Search ............................ 568/3, 1; 556/8, 556/7, 11, 14; 502/103, 118, 202, 232

(56) References Cited

U.S. PATENT DOCUMENTS

| | | | |
|---|---|---|---|
| 5,347,024 | 9/1994 | Nickias et al. | 556/11 |
| 5,447,895 | 9/1995 | Marks et al. | 502/117 |
| 5,496,960 | 3/1996 | Piers et al. | 556/8 |

FOREIGN PATENT DOCUMENTS

| | | |
|---|---|---|
| 710 663 | 10/1995 | (EP) . |
| 93/11172 | 6/1993 | (WO) . |
| 93/19103 | 9/1993 | (WO) . |
| 95/24268 | 9/1995 | (WO) . |
| 96/04319 | 2/1996 | (WO) . |
| 96/23005 | 8/1996 | (WO) . |
| 96/28480 | 9/1996 | (WO) . |
| 96/41808 | 12/1996 | (WO) . |
| 97/19959 | 6/1997 | (WO) . |

Primary Examiner—Yogendra N. Gupta
Assistant Examiner—D G. Hamlin
(74) Attorney, Agent, or Firm—Connolly Bove Lodge Hutz LLP

(57) ABSTRACT

The present invention relates to a supported chemical compound of the formula (I)

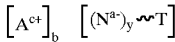

(I)

in which
$A^{c+}$ is a cation,
c is an integer from 1 to 10,
b is an integer $\geq 0$,
T is a support,
y is an integer $\geq 1$,
a is an integer from 0 to 10, where $a \cdot y = c \cdot b$, and
N is a unit of the formula (II)

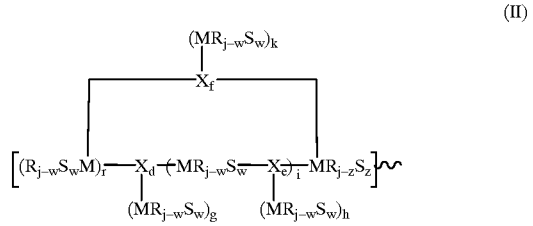

(II)

in which
R independently at each occurrence is an identical or different substituent of $M_1$ such as a halogen atom or a $C_1$–$C_{40}$ carbon-containing group, such as a $C_1$–$C_{40}$-alkyl, $C_1$–$C_{40}$-haloalkyl, $C_6$–$C_{40}$-aryl, $C_6$–$C_{40}$-haloaryl, $C_7$–$C_{40}$-arylalkyl or $C_7$–$C_{40}$-haloarylalkyl group,
X independently at each occurrence is identical or different and is a $C_1$–$C_{40}$ carbon-containing group, for example a divalent, carbon-containing group such as a $C_1$–$C_{40}$-alkylene, $C_1$–$C_{40}$-haloalkylene, $C_6$–$C_4$-arylene, $C_6$–$C_{40}$-haloarylene, $C_7$–$C_{40}$-arylalkylene or $C_7$–$C_{40}$-halo-arylalkylene, $C_2$–$C_{40}$-alkynylene, $C_2$–$C_{40}$-haloalkynylene, $C_2$–$C_{40}$-alkenylene or $C_2$–$C_{40}$haloalkenylene group, or a trivalent, carbon-containing group, such as a $C_1$–$C_{40}$-alkanetriyl, $C_1$–$C_{40}$-haloalkanetriyl, $C_6$–$C_{40}$-arenetriyl, $C_6$–$C_{40}$-haloarenetriyl, $C_7$–$C_{40}$-arenealkanetriyl, $C_7$–$C_{40}$-haloarenealkanetriyl, $C_2$–$C_{40}$-alkynetriyl, $C_2$–$C_{40}$haloalkynetriyl, $C_2$–$C_{40}$-alkenetriyl or $C_2$–$C_{40}$-haloalkenetriyl group,
M independently at each occurrence is identical or different and is an element of group IIa, IIIa, IVa or Va of the Periodic Table of the Elements,
d is 0 or 1, e is 0 or 1, f is 0 or 1,
g is an integer from 0 to 10, h is an integer from 0 to 10, k is an integer from 0 to 10, r is an integer from 0 to 10,
i is an integer from 0 to 1000,
j is an integer from 1 to 6,
S at each occurrence is identical or different and is a spacer which links M covalently with T,
w is identical or different at each occurrence and is 0, 1 or 2, and z is 0, 1 or 2.

The compound of the formula (I) is suitable as a catalyst component for olefin polymerization.

21 Claims, No Drawings

COVALENTLY SUPPORTED CHEMICAL COMPOUND WHICH CAN BE NEUTRAL OR IONIC IN THE CLAIMS

The present invention relates to a covalently supported chemical compound which can be neutral or ionic in composition and which is able in combination with a transition metal compound such as a metallocene to form a catalyst system which is suitable for the polymerization of olefins. With this system it is possible to forego the use of aluminoxanes such as methylaluminoxane as cocatalyst and yet still to obtain high catalyst activity.

The role of cationic complexes in Ziegler-Natta polymerization using metallocenes has been generally recognized (M. Bochmann, Nachr. Chem. Lab. Techn. 1993, 41, 1220).

Hitherto the most effective cocatalyst, MAO has the disadvantage of being employed in a high excess. The preparation of cationic alkyl complexes in opens up the way to MAO-free catalysts having comparable activity. Cationic alkyl complexes are synthesized by a) protolysis of metallocene compounds with, for example, weakly acidic ammonium salts of the highly stable nonbasic tetra(pentafluorophenyl)borate (e.g. $[PhMe_2NH]^+[B(C_6F_5)_4]^-$), b) abstraction of an alkyl group from metallocene compounds with the aid of strong Lewis acids, possible Lewis acids including both salts of the form $(Ph_3C^+ BR_4^-)$ and strong, neutral Lewis acids such as $B(C_6F_5)_3$, or c) oxidation of metallocene-dialkyl complexes with, for example, $AgBPh_4$ or $[Cp_2Fe][BPh_4]$.

The synthesis of "cation-like" metallocene polymerization catalysts is described in J. Am. Chem. Soc. 1991, 113, 3623. In that document, abstraction of alkyl from a metallocene-dialkyl compound takes place by means of tris(pentafluorophenyl)borane. EP 427 697 claims this synthetic principle and a corresponding catalyst system, consisting of a neutral metallocene species (e.g. $Cp_2ZrMe_2$), a Lewis acid (e.g. $B(C_6F_5)_3$) and aluminum alkyls. A process for preparing salts of the general formula $LMX^+XA^-$ in accordance with the above-described principle is claimed in EP 520 732.

EP 558 158 claims zwitterionic catalyst systems which are prepared from metallocene-dialkyl compounds and salts of the form $[R_3NH]^+[BPh_4]^-$. The reaction of such a salt with, say, $Cp^*_2ZrMe_2$, via protolysis with elimination of methane, produces a zirconocene-methyl cation as intermediate. This intermediate reacts by way of C—H activation to form the zwitterion $Cp^*_2Zr^+$—$(m$—$C_6H_4)$—$BPh_3^-$.

In accordance with this reaction principle, following the protolysis of a metallocene-dialkyl species with a perfluorinated $[R_3NH]^+[B(C_6F_5)_4]^-$ salt in the first step, a cationic species is likewise formed, although now the follow-on reaction (C—H activation) to form zwitterionic complexes is not possible. Consequently, salts of the form $[Cp_2Zr$—$R$—$RH]^+[B(C_6F_5)_4]^-$ are formed. U.S. Pat. No. 5,348,299 claims corresponding systems in which dimethylanilinium salts with perfluorinated tetraphenylborate anions are used. The supporting of such systems is aimed at better morphology of the polymer and is described in WO 91/09882.

The disadvantage of previous supporting techniques, as are described in WO 91/09882, is that the ionic catalyst system is attached only physically to the support. It can therefore easily be removed from the surface of the support by solvents. The homogeneous polymerization which is then carried out leads to a poorer morphology of the polymer.

The present invention therefore provides a supported chemical compound, and a process for preparing this supported chemical compound, which is bonded covalently to a support material. It also provides a catalyst system comprising at least one transition metal compound and at least one novel, supported chemical compound as cocatalyst. Also described is a process for preparing polyolefins in the presence of the supported chemical compound.

The supported chemical compound consists of a support T, y units N of the formula (II) given below, which are bonded covalently to the support, and b units A.

The supported chemical compound has the formula (I)

(I)

in which
$A^{c+}$ is a cation,
c is an integer from 1 to 10,
b is an integer $\geq 0$,
T is a support,
y is an integer $\geq 1$,
a is an integer from 0 to 10, where $a \cdot y = c \cdot b$, and
N is a unit of the formula (II)

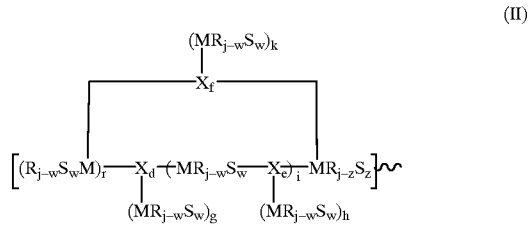

(II)

in which
R independently at each occurrence is an identical or different substituent of M, such as a halogen atom or a $C_1$–$C_{40}$ carbon-containing group, such as a $C_1$–$C_{40}$-alkyl, $C_1$–$C_{40}$-haloalkyl, $C_6$–$C_{40}$-aryl, $C_6$–$C_{40}$-haloaryl, $C_7$–$C_{40}$-arylalkyl or $C_7$–$C_{40}$-haloarylalkyl group, X independently at each occurrence is identical or different and is a $C_1$–$C_{40}$ carbon-containing group, for example a divalent, carbon-containing group such as a $C_1$–$C_{40}$-alkylene, $C_1$–$C_{40}$-haloalkylene, $C_6$–$C_{40}$-arylene, $C_6$–$C_{40}$-haloarylene, $C_7$–$C_{40}$-arylalkylene or $C_7$–$C_{40}$-halo-arylalkylene, $C_2$–$C_{40}$-alkynylene, $C_2$–$C_{40}$-haloalkynylene, $C_2$–$C_{40}$-alkenylene or $C_2$–$C_{40}$-haloalkenylene group, or a trivalent, carbon-containing group, such as a $C_1$–$C_{40}$-alkanetriyl, $C_1$–$C_{40}$-haloalkanetriyl, $C_6$–$C_{40}$-arenetriyl, $C_6$–$C_{40}$-haloarenetriyl, $C_7$–$C_{40}$-arenalkanetriyl, $C_7$–$C_{40}$-haloarenealkanetriyl, $C_2$–$C_{40}$-alkynetriyl, $C_2$–$C_{40}$-haloalkynetriyl, $C_2$–$C_{40}$-alkenetriyl or $C_2$–$C_{40}$-haloalkenetriyl group, M independently at each occurrence is identical or different and is an element of group IIa, IIIa, IVa or Va of the Periodic Table of the Elements, d is 0 or 1, e is 0 or 1, f is 0 or 1, g is an integer from 0 to 10, h is an integer from 0 to 10, k is an integer from 0 to 10, r is an integer from 0 to 10, i is an integer from 0 to 1000, j is an integer from 1 to 6, S at each occurrence is identical or different and is a spacer which links M covalently with T, w is identical or different at each occurrence and is 0, 1 or 2, and z is 0, 1 or 2.

If a=0, then unit N is neutral; if a≧1, N is a negatively charged unit.

Each of the y units N of the formula (II) can be bonded covalently to the support T, starting from M, directly or by way of one or more spacers S. In this case, each M and each spacer S can have one or more covalent bonds to the support T. This is symbolized in the formulae (I), (II), (III) and (IV) by the sign ∿. For clarity in formula (II) the bond to the support (i.e. ∿) is shown by way of example only for one group MRS, although the other groups MRS can also bond to the support. In the groups MRS in which z is 0 and/or w is 0, M is bonded directly and covalently to the support.

Where the supported chemical compound of the formula (I) has two or more groups MRS these groups can be identical or different from one another. The number of substituents R in a group MRS depends on the (co)valence of M. Preferably, z is 1 and all w are 0. The spacer S preferably has the formula (III)

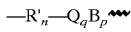  (III)

in which R' is identical or different at each occurrence and is a $C_1$–$C_{40}$ carbon-containing group, such as a $C_1$–$C_{40}$-alkylene, $C_1$–$C_{40}$-haloalkylene, $C_6$–$C_{40}$-arylene, $C_6$–$C_{40}$-haloarylene, $C_7$–$C_{40}$-arylalkylene or $C_7$–$C_{40}$-halo-arylalkylene, $C_2$–$C_{40}$-alkynylene, $C_2$–$C_{40}$-haloalkynylene, $C_2$–$C_{40}$-alkenylene, $C_2$–$C_{40}$-haloalkenylene, $C_1$–$C_{40}$-aryleneoxy, $C_1$–$C_{40}$-alkylaryleneoxy or $C_1$–$C_{40}$-arylalkyleneoxy group, —NR"—, —PR"—, —P(O)R"—, —Si(R")$_2$—O—Si(R")$_2$—, —C—O—SiR"$_2$— or —CONR"—, where R" is a $C_1$–$C_{40}$ carbon-containing group, such as a $C_1$–$C_{40}$ alkyl, $C_1$–$C_{40}$-haloalkyl, $C_6$–$C_{40}$-aryl, $C_6$–$C_{40}$-haloaryl, $C_7$–$C_{40}$-arylalkyl or $C_7$–$C_{40}$-halo-arylalkyl, $C_2$–$C_{40}$-alkynyl, $C_2$–$C_{40}$-haloalkynyl, $C_2$–$C_{40}$alkenyl, $C_2$–$C_{40}$-haloalkenyl, $C_1$–$C_{40}$-aryloxy, $C_1$–$C_{40}$-alkylaryloxy or $C_1$–$C_{40}$-arylalkyloxy group, or R' is a heteroatom-containing group, such as —SO—, —SO$_2$—, —S—, —CO—, —CO$_2$—, —O—, —NH— or —PH—, n is an integer ≧0, preferably 0 or 1, Q is Si, N, P, S or O, q is 0 or 1, B is a substituent of Q and is NH$_2$, PH$_2$ or a $C_1$–$C_{40}$ carbon-containing group, such as a $C_1$–$C_{40}$ alkyl, $C_1$–$C_{40}$-haloalkyl, $C_6$–$C_{40}$-aryl, $C_6$–$C_{40}$-haloaryl, $C_7$–$C_{40}$-arylalkyl or $C_7$–$C_{40}$-halo-arylalkyl, $C_2$–$C_{40}$-alkynyl, $C_2$–$C_{40}$-haloalkynyl, $C_2$–$C_{40}$-alkenyl, $C_2$–$C_{40}$-haloalkenyl, $C_6$–$C_{40}$-aryloxy, $C_7$–$C_{40}$-alkylaryloxy or a $C_7$–$C_{40}$-arylalkyloxy group, —NR"$_2$, —COR"—, —CO$_2$R"—, —PR"$_2$, —P(O)R"$_2$, Si(R")$_2$—O—Si(R")$_3$—, —C—O—SiR"$_3$—, —CONR"$_2$, —SOR"; —SO$_2$R"—, —SR", —OR", —NHR" or —PHR" where R" is a $C_1$–$C_{40}$ carbon-containing group, such as a $C_1$–$C_{40}$-alkyl, $C_1$–$C_{40}$-haloalkyl, $C_6$–$C_{40}$-aryl, $C_6$–$C_{40}$-haloaryl, $C_7$–$C_{40}$-arylalkyl or $C_7$–$C_{40}$-halo-arylalkyl, $C_2$–$C_{40}$-alkynyl, $C_2$–$C_{40}$-haloalkynyl, $C_2$–$C_{40}$-alkenyl, $C_2$–$C_{40}$-haloalkenyl, $C_7$–$C_{40}$-aryloxy, $C_7$–$C_{40}$-alkylaryloxy or a $C_7$–$C_{40}$-arylalkyloxy group, and p is an integer ≧0, preferably from 0 to 6.

B here can link two spacers S to one another, ∿ denotes one or more covalent bonds to the support T. In this case B is as defined for R' and is for example a $C_1$–$C_{40}$-alkylene, $C_1$–$C_{40}$-haloalkylene, $C_6$–$C_{40}$-arylene, $C_6$–$C_{40}$-haloarylene, $C_7$–$C_{40}$-arylalkylene or $C_7$–$C_{40}$-halo-arylalkylene, $C_2$–$C_{40}$-alkynylene, $C_2$–$C_{40}$-haloalkynylene, $C_2$–$C_{40}$-alkeny-lene, $C_2$–$C_{40}$-haloalkenylene, $C_6$–$C_{40}$-aryleneoxy, $C_7$–$C_{40}$-alkylaryleneoxy or $C_7$–$C_{40}$-arylalkyleneoxy group, —NR"—, —PR"—, —P(O)R"—, —Si(R")$_2$—O—Si(R")$_2$—, —C—O—SiR"$_2$— or —CONR"—, where R" is a $C_1$–$C_{40}$ carbon-containing group, such as a $C_1$–$C_{40}$ alkyl, $C_1$–$C_{40}$-haloalkyl, $C_6$–$C_{40}$-aryl, $C_6$–$C_{40}$-haloaryl, $C_7$–$C_{40}$-arylalkyl or $C_7$–$C_{40}$-halo-arylalkyl, $C_2$–$C_{40}$-alkynyl, $C_2$–$C_{40}$-haloalkynyl, $C_2$–$C_{40}$-alkenyl, $C_2$–$C_{40}$-haloalkenyl, $C_6$–$C_{40}$-aryloxy, $C_7$–$C_{40}$-alkylaryloxy or $C_7$–$C_{40}$-arylalkyloxy group, or B is a heteroatom containing group, such as —SO—, —SO$_2$—, —S—, —CO—, —CO$_2$—, —O—, —NH— or —PH—.

If q is 0, R' bonds to the support; if q is 1, Q bonds to the support. B are substituents of Q which do not bond to the support.

With particular preference, in formula (III) Q is Si and q is 1.

R in formula (II) is preferably a $C_1$–$C_{40}$ hydrocarbon radical which can be halogenated, preferably perhalogenated, with halogens such as fluorine, chlorine, bromine or iodine, in particular a halogenated, especially perhalogenated $C_1$–$C_{30}$-alkyl group, such as trifluoromethyl, pentachloroethyl, heptafluoroisopropyl or monofluoroisobutyl or a halogenated, especially perhalogenated $C_6$–$C_{30}$-aryl group, such as pentafluorophenyl, heptachloronaphthyl, heptafluoronaphthyl, heptafluorotolyl, 3,5-bis(trifluoromethyl)phenyl, 2,4,6-tris(trifluoromethyl)phenyl or 2,2'-(octafluoro)biphenyl.

X in formula (II) is preferably a $C_6$–$C_{30}$-arylene group, a $C_2$–$C_{30}$-alkenylene group, a $C_2$–$C_{30}$-alkynylene group, a $C_6$–$C_{30}$-arenetriyl group, a $C_2$–$C_{30}$-alkenetriyl group or a $C_2$–$C_{30}$-alkynetriyl group, all of which can be halogenated, especially perhalogenated.

Preferably, j is 1 or 2 if M is an element of group IIa; j is 2 or 3 if M is an element of group IIIa; j is 3 or 4 if M is an element of group IVa, and j is 4 or 5 if M is an element of Va. With particular preference, M is an element of group IIIa, especially boron. i is preferably an integer from 0 to 6, particularly preferably 0 or 1. a and b are preferably 0, 1 or 2 and c is preferably 1 or 2. g, h, k and r are preferably 0 or 1.

Preferred cations $A^{c+}$ in formula (I) are cations of group Ia, IIa, IIIa of the Periodic Table of the Elements, a carbenium, oxonium or sulfonium cation or a quaternary ammonium compound, especially carbenium ions ($R_3C^+$) or quaternary ammonium ions having an acidic H function ($R_3NH^+$). Particular preference is given to quaternary ammonium salts having acidic H functions.

Where a is ≧1 and all M are boron, it is preferred for the number of boron atoms to be ≦4, particularly preferably 2.

A particularly preferred embodiment comprises the supported chemical compound of the formula (IV)

  (IV)

in which

M is an element of group IIIa of the Periodic Table of the Elements,

R independently at each occurrence is an identical or different substituent of M, such as a halogen atom or a $C_1$–$C_{40}$ carbon-containing group, such as a $C_1$–$C_{40}$-alkyl, $C_1$–$C_{40}$-haloalkyl, $C_6$–$C_{40}$-aryl, $C_6$–$C_{40}$-haloaryl, $C_7$–$C_{40}$-arylalkyl or $C_7$–$C_{40}$-halo-arylalkyl group, j is an integer from 1 to 4, z is 0, 1 or 2, T is a support, S is a spacer which is bonded covalently to T and preferably has the formula (III), a is 0, 1 or 2, A can be a cation of group Ia, IIa, IIIa of the Periodic Table of the Elements, a carbenium, oxonium or sulfonium cation or a quaternary ammonium compound, b is 0, 1 or 2, and c is 1 or 2.

The support T is preferably porous inorganic or organic solid. On its surface the y units N are covalently bonded, directly or by way of one or more spacers S. The support preferably comprises at least one inorganic oxide, such as silica, alumina, zeolites, MgO, $ZrO_2$, $TiO_2$, $B_2O_3$, CaO, ZnO, $ThO_2$, $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$, or $Li_2O$, especially silica and/or alumina. The support may also comprise at least one polymer, for example a homo- or copolymer, a crosslinked polymer, or polymer blends. Examples of polymers are polyethylene, polypropylene, polybutylene, polystyrene, divinylbenzene-crosslinked polystyrene, polyvinyl chloride, acrylonitrile-butadiene-styrene copolymer, polyamide, polymethacrylate, polycarbonate, polyester, polyacetal or polyvinyl alcohol. The support can have a specific surface area in the range from 10 to 100 m$^2$/g, preferably from 150 to 500 m$^2$/g. The mean particle size of the support can be from 1 to 500 μm, preferably from 5 to 350 μm and, with particular preference, from 10 to 200 μm.

The support is preferably porous with a support pore volume of from 0.5 to 4.0 ml/g, preferably from 1.0 to 3.5 ml/g. A porous support has a certain proportion of voids (pore volume). The form of the pores is usually irregular, in many cases spherical. The pores can be interconnected by small pore openings. The pore diameter is preferably from about 2 to 50 nm. The particle form of the porous support can be irregular or spherical. The support can be subjected to thermal, chemical or mechanical aftertreatment, thereby making it possible to influence the particle form of the support. The particle size of the support can be adjusted as desired by means, for example, of cryogenic milling and/or sieving.

To prepare the novel supported chemical compound it is possible to react a support starting material T—H with at least one starting compound N—G. The surface of this support starting material carries functional groups H, which preferably have the following formula (V):

—(D)$_s$(E)$_t$           (V)

in which

D is Al, B, C, Si, N, P, O or S, s is 0 or 1,

E is identical or different at each occurrence and is a halogen, a hydroxyl, carbonyl chloride, carboxamide, aryl halide, benzyl halide, alkyl halide, alkoxy, aryloxy, alkylamine, arylamine, alkylphosphine, arylphosphine, thioether, thio, cyanate, isocyanate, cycloalkadienyl, sulfonic acid, aldehyde, keto, alkenyl or aryllithium group or a carbon-containing group which comprises cycloalkadienyl or cycloalkadienyllithium groups, and t is 1, 2, 3, 4 or 5.

The functional groups H of the support starting material T—H can be introduced by chemical functionalization with reactive compounds or may be already present from the start. The support starting material T—H can also be treated by heating at temperatures from 50° C. to 1000° C. in a stream of inert gas or in vacuo at from 0.01 to 0.001 bar or by chemical inertization by reaction with alkylaluminum, -magnesium, -boron or -lithium compounds or by chemical functionalization with reactive compounds.

For example, support starting materials comprising $SiO_2$ can be functionalized as follows. A suspension of $SiO_2$ (pretreated: 4 h; 200° C., 0.01 bar) in an appropriate solvent, such as pentane, hexane, heptane, toluene or dichloromethane, is reacted with a silyl chloride compound which comprises a functional group, is heated at boiling temperature for several hours and then is washed with an appropriate solvent. The reaction temperature is preferably at least 50° C., in particular from 50° C. to 150° C. The reaction time is from 1 to 600 minutes, preferably from 1 to 2 hours. The silyl chloride compound is preferably employed in an equimolar ratio relative to the proportion of hydroxyl groups on the surface of the $SiO_2$. The reaction is conducted under inert conditions. Appropriate solvents for the washing procedure are, for example, pentane, hexane, heptane, toluene or dichloromethane, with or without addition of amines in order to scavenge any HCl formed. Subsequently, solvent residues are removed in vacuo at from 20 to 200° C. and from 0.01 to 0.001 bar.

In the starting compound N—G, N is as defined in formula (II) and G denotes leaving groups such as —OR$^2$, Hal, —NR$^2{}_2$, —H, —CO, —SR$^2{}_2$, —SO$_2$ or —PR$^2{}_3$, in which R$^2$ is as defined for R, which on reaction with the support starting material T—H are eliminated with the formation of one or more covalent bonds between N and T.

Examples of starting compounds N—G are:

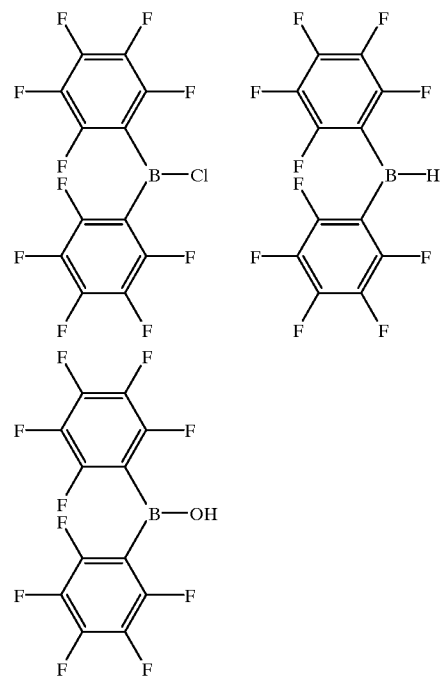

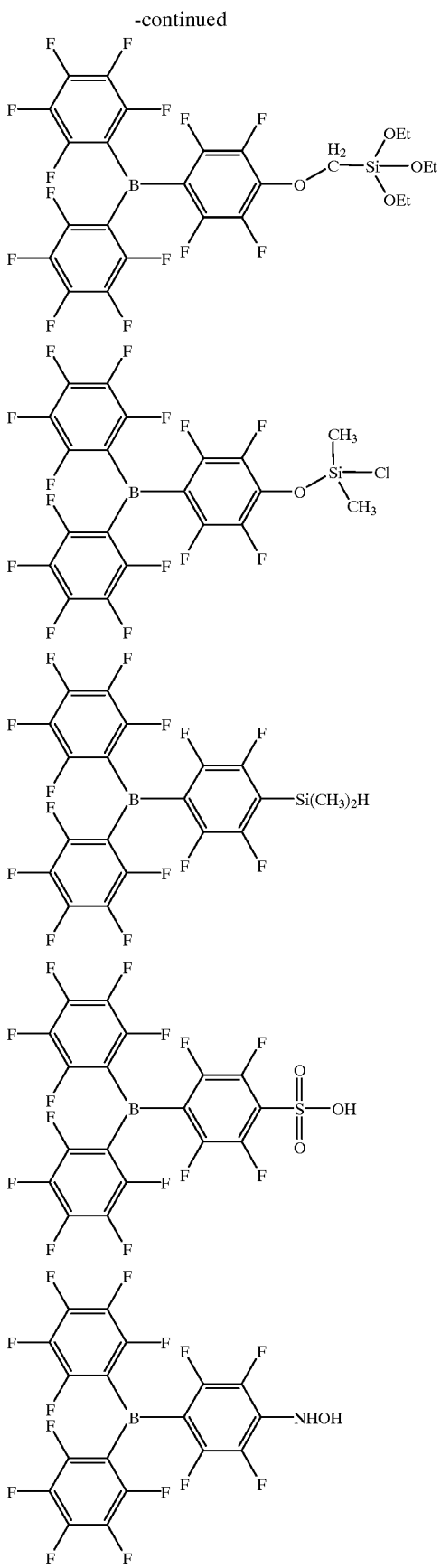

The preparation of starting compounds N—G can take place, for example, in accordance with the following reaction scheme:

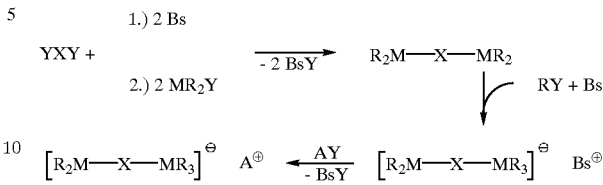

where

X is a $C_1$–$C_{40}$ carbon-containing group, such as a $C_1$–$C_{40}$-alkylene, $C_1$–$C_{40}$-haloalkylene, $C_6$–$C_{40}$-arylene, $C_6$–$C_{40}$-haloarylene, $C_7$–$C_{40}$-arylalkylene or $C_7$–$C_{40}$-halo-arylalkylene, $C_2$–$C_{40}$-alkynylene, $C_2$–$C_{40}$-haloalkynylene, $C_2$–$C_{40}$-alkenylene or $C_2$–$C_{40}$-haloalkenylene group, Y independently at each occurrence is identical or different and is a leaving group, preferably a hydrogen or halogen atom, R independently at each occurrence is identical or different and is a halogen atom or a $C_1$–$C_{40}$ carbon-containing group, such as a $C_1$–$C_{40}$-alkyl, $C_1$–$C_{40}$-haloalkyl, $C_6$–$C_{40}$-aryl, $C_6$–$C_{40}$-haloaryl, $C_7$–$C_{40}$-arylalkyl or $C_7$–$C_{40}$-halo-arylalkyl group, Bs is a base, preferably an organolithium compound or a Grignard compound, M is identical or different at each occurrence and is an element of groups IIa, IIIa, IVa or Va of the Periodic Table of the Elements, and A is a cation of group Ia, IIa, IIIa of the Periodic Table of the Elements, a carbenium, oxonium or sulfonium cation, or a quaternary ammonium compound.

The reaction of T—H with N—G can be carried out in an appropriate solvent such as pentane, heptane, toluene, dichloromethane or dichlorobenzene, in which the support starting material T—H is suspended and to which a solution of the starting compound N—G is added dropwise. Alternatively, the support starting material T—H is reacted with a solution of the compound N—G, with stirring, such that from 50 to 400% of the pore volume of the support component is filled. This can be followed by a washing operation as described above, and solvent residues can be removed in vacuo at from 20 to 200° C. and from 0.01 to 0.001 bar. The preparation of the novel supported chemical compound is conducted at from −80 to 200° C., preferably from −20 to 100° C., with a contact time of between 15 minutes and 25 hours, preferably between 15 minutes and 5 hours.

Subsequently it is possible to introduce a cation $A^{c+}$. This can be done by reacting the product of the reaction of T—H and N—G with a carbon-containing alkali metal compound or alkaline earth metal compound, such as lithium-pentafluorobenzene or lithium-tris(trifluoromethyl)benzene, and then with a compound A—V in which A is as defined for formula (I) and V is a leaving group which is defined as for G.

The novel supported chemical compound can be used together with a transition metal compound as a catalyst system for olefin polymerization. In the reaction of the supported chemical compound of the formula (I) with a ligand-stabilized transition metal compound $M^1L_x$ (where $M^1$ is a transition metal, L is a ligand and x is an integer from 1 to 6 which depends on the valency of $M^1$), b neutral compounds AL and b·c catalytically active compounds

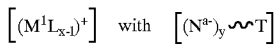

as cocatalyst component are formed.

The transition metal compound $M^1L_x$ comprises at least one central metal atom $M^1$ to which there is attached at least one π ligand, for example a cyclopentadienyl ligand, In addition, substituents such as halogen or carbon-containing groups, for example alkyl, alkoxy or aryl groups, can also be attached as ligands L to the central metal atom $M^1$. The central metal atom is preferably an element of subgroup III, IV, V or VI of the Periodic Table of the Elements, in particular from subgroup IV of the Periodic Table of the Elements, such as Ti, Zr or Hf. The transition metal compound $M^1L_x$ is preferably a metallocene, in particular a chiral metallocene. The term cyclopentadienyl ligand includes unsubstituted cyclopentadienyl radicals and substituted cyclopentadienyl radicals such as methylcyclopentadienyl, indenyl, 2-methylindenyl, 2-methyl-4-phenylindenyl, tetrahydroindenyl, benzoindenyl, fluorenyl, benzofluorenyl, tetrahydrofluorenyl and octahydrofluorenyl radicals. The π ligands, for example cyclopentadienyl ligands, can be bridged or nonbridged, with both single and multiple bridges—including those by way of ring systems—being possible. The term metallocene also embraces compounds having more than one metallocene fragment, known as polynuclear metallocenes. These can have any desired substitution patterns and bridging variants. The individual metallocene fragments of such polynuclear metallocenes can be either the same as or different from one another. Examples of such polynuclear metallocenes are, for instance, described in EP-A-632 063, JP-A-04/80214, JP-A-04/85310 and EP-A-654 476.

Particular preference is given to nonbridged or bridged metallocenes of the formula VI

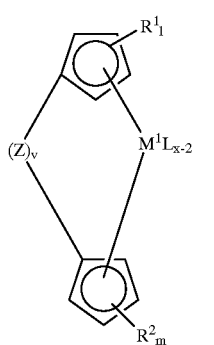

(VI)

in which
- $M^1$ is a metal of subgroup III, IV, V or VI of the Periodic Table of the Elements, especially Zr or Hf,
- $R^1$ is identical or different at each occurrence and is a hydrogen atom, $SiR^3_3$, in which $R^3$ is identical or different at each occurrence and is a hydrogen atom or a $C_1$–$C_{40}$ carbon-containing group, such as $C_1$–$C_{20}$-alkyl, $C_1$–$C_{10}$-fluoroalkyl, $C_1$–$C_{10}$-alkoxy, $C_6$–$C_{24}$-aryl, $C_6$–$C_{10}$-fluoroaryl, $C_6$–$C_{10}$-aryloxy, $C_2$–$C_{10}$-alkenyl, $C_7$–$C_{40}$-arylalkyl, $C_7$–$C_{40}$-alkylaryl or $C_8$–$C_{40}$-arylalkenyl, or is a $C_1$–$C_{30}$ carbon-containing group, such as $C_1$–$C_{25}$-alkyl, for example methyl, ethyl, tert-butyl, cyclohexyl or octyl, $C_2$–$C_{25}$-alkenyl, $C_3$–$C_{15}$-alkylalkenyl, $C_6$–$C_{24}$-aryl, $C_5$–$C_{24}$-heteroaryl, such as pyridyl, furyl or quinolyl, $C_7$–$C_{30}$-arylalkyl, $C_7$–$C_{30}$-alkylaryl, fluorine-containing $C_1$–$C_{25}$-alkyl, fluorine-containing $C_6$–$C_{24}$-aryl, fluorine-containing $C_7$–$C_{30}$-arylalkyl, fluorine-containing $C_7$–$C_{30}$-alkylaryl or $C_1$–$C_{12}$-alkoxy, or two or more radicals $R^1$ can be linked to one another such that the radicals $R^1$ and the atoms of the cyclopentadienyl ring which link them form a $C_4$–$C_{24}$ ring system which can in turn be substituted,
- $R^2$ is identical or different at each occurrence and is a hydrogen atom, $SiR^3_3$, in which $R^3$ is identical or different at each occurrence and is a hydrogen atom or a $C_1$–$C_{40}$ carbon-containing group, such as $C_1$–$C_{20}$-alkyl, $C_1$–$C_{10}$-fluoroalkyl, $C_1$–$C_{10}$-alkoxy, $C_6$–$C_{14}$-aryl, $C_6$–$C_{10}$-fluoroaryl, $C_6$–$C_{10}$-aryloxy, $C_2$–$C_{10}$-alkenyl, $C_7$–$C_{40}$-arylalkyl, $C_7$–$C_{40}$-alkylaryl or $C_8$–$C_{40}$-arylalkenyl, or is a $C_1$–$C_{30}$ carbon-containing group, such as $C_1$–$C_{25}$-alkyl, for example methyl, ethyl, tert-butyl, cyclohexyl or octyl, $C_2$–$C_{25}$-alkenyl, $C_3$–$C_{15}$-alkylalkenyl, $C_6$–$C_{24}$-aryl, $C_5$–$C_{24}$-heteroaryl, for example pyridyl, furyl or quinolyl, $C_7$–$C_{30}$-arylalkyl, $C_7$–$C_{30}$-alkylaryl, fluorine-containing $C_1$–$C_{25}$-alkyl, fluorine-containing $C_6$–$C_{24}$-aryl, fluorine-containing $C_7$–$C_{30}$-arylalkyl, fluorine-containing $C_7$–$C_{30}$-alkylaryl or $C_1$–$C_{12}$-alkoxy, or two or more radicals $R^2$ can be linked to one another such that the radicals $R^2$ and the atoms of the cyclopentadienyl ring which link them form a $C_4$–$C_{24}$ ring system which can in turn be substituted,
- I is 5if v=0, and I is 4if v=1,
- m is 5if v=0, and m is 4if v=1,
- L is identical or different at each occurrence and is a halogen atom or a carbon-containing radical having 1–20 carbon atoms, for example $C_1$–$C_{20}$-alkyl, $C_2$–$C_{20}$-alkenyl, $C_1$–$C_{20}$-alkoxy, $C_6$–$C_{14}$-aryloxy or $C_6$–$C_{40}$-aryl,
- x is an integer from 1 to 6, x preferably being 4 if $M^1$=Ti, Zr or Hf,
- Z is a bridging structural element between the two cyclopentadienyl rings, and v is 0 or 1.

Examples of Z are groups $M^2R^4R^5$ in which $M^2$ is carbon, silicon, germanium or tin and $R^4$ and $R^5$ are identical or different and are a $C_1$–$C_{20}$ carbon-containing group, such as $C_1$–$C_{10}$-alkyl, $C_6$–$C_{14}$-aryl or trimethylsilyl. Z is preferably $CH_2$, $CH_2CH_2$, $CH(CH_3)CH_2$, $CH(C_4H_9)C(CH_3)_2$, $C(CH_3)_2$, $(CH_3)_2Si$, $(CH_3)_2Ge$, $(CH_3)_2Sn$, $(C_6H_5)_2Si$, $(C_6H_5)(CH_3)Si$, $(C_6H_5)_2Ge$, $(C_6H_5)_2Sn$, $(CH_2)_4Si$, $CH_2Si(CH_3)_2$, $o\text{-}C_6H_4$ or $2,2'\text{-}(C_6H_4)_2$. Z can also form, with one or more radicals $R^1$ and/or $R^2$, a monocyclic or polycyclic ring system.

Preference is given to chiral bridged metallocenes of the formula VI, especially those in which v is 1 and one or both cyclopentadienyl rings are substituted so that they constitute an indenyl ring. The indenyl ring is preferably substituted, especially in position(s) 2; 4; 2,4,5; 2,4,6; 2,4,7 or 2,4,5,6, by $C_1$–$C_{20}$ carbon-containing groups, such as $C_1$–$C_{10}$-alkyl or $C_6$–$C_{20}$aryl, in which case two or more substituents of the indenyl ring may together also form a ring system.

The following examples of metallocenes serve to illustrate the present invention but have not restrictive character:

Bis(cyclopentadienyl)zirconium dimethyl
Bis(indenyl)zirconium dimethyl
Bis(fluorenyl)zirconium dimethyl
(Indenyl)(fluorenyl)zirconium dimethyl (3-Methyl-5-naphthylindenyl)(2,7-di-tertbutylfluorenyl)zirconium dimethyl
(3-Methyl-5-naphthylindenyl)(3,4,7-trimethoxyfluorenyl)zirconium dimethyl
(Pentamethylcyclopentadienyl)(tetrahydroindenyl)zirconium dimethyl
(Cyclopentadienyl)(1-octen-8-ylcyclopentadienyl)zirconium dimethyl
(Indenyl)(1buten-4-ylcydopentadienyl)zirconium dimethyl
[1,3-Bis(trimethylsilyl)cyclopentadienyl](3,4-benzofluorenyl)zirconium dimethyl
Bis(cyclopentadienyl)titanium dimethyl
Dimethylsilanediylbis(indenyl)zirconium dimethyl
Dimethylsilanediylbis(tetrahydroindenyl)zirconium dimethyl
Dimethylsilanediyl(cyclopentadienyl)(indenyl)zirconium dimethyl
Dimethylsilanediylbis(2-methylindenyl)zirconium dimethyl
Dimethylsilanediylbis(2-ethylindenyl)zirconium dimethyl
Dimethylsilanediylbis(2-methyl-4,5-benzoindenyl)zirconium dimethyl
Dimethylsilanediylbis(2-ethyl-4,5-benzoindenyl)zirconium dimethyl
Dimethylsilanediylbis(4,5-dihydro-8-methyl-7H-cyclopent[e]acenaphthylen-7-yliden)zirconium dimethyl
Dimethylsilanediyl(2-methyl-4,5-benzoindenyl)(2-methyl-4-phenylindenyl)zirconium dimethyl
Dimethylsilanediyl(2-ethyl-4,5-benzoindenyl)(2-methyl-4-phenylindenyl)zirconium dimethyl
Dimethylsilanediyl(2-methyl-4,5-benzoindenyl)(2-ethyl-4-phenylindenyl)zirconium dimethyl
Dimethylsilanediyl(2-ethyl-4,5-benzoindenyl)(2-ethyl-4-naphthylindenyl)zirconium dimethyl
Dimethylsilanediyl(2-methylindenyl)(4-phenylindenyl)zirconium dimethyl
Dimethylsilanediylbis(2-methyl-4-phenylindenyl)zirconium dimethyl
Dimethylsilanediylbis(2-ethyl-4-phenylindenyl)zirconium dimethyl
Dimethylsilanediylbis(2-methyl-4,6-diisopropylindenyl)zirconium dimethyl
Dimethylsilanediylbis(2-ethyl-4,6-diisopropylindenyl)zirconium dimethyl
Dimethylsilanediylbis(2-methyl-4-naphthylindenyl)zirconium dimethyl
Dimethylsilanediylbis(2-ethyl-4-naphthylindenyl)zirconium dimethyl
Methylphenylsilanediylbis(indenyl)zirconium dimethyl
Methylphenylsilanediyl(cyclopentadienyl)(indenyl)zirconium dimethyl
Methylphenylsilanediylbis(tetrahydroindenyl)zirconium dimethyl
Methylphenylsilanediylbis(2-methylindenyl)zirconium dimethyl
Methylphenylsilanediylbis(2-ethylindenyl)zirconium dimethyl
Methylphenylsilanediylbis(2-methyl-5-benzoindenyl)zirconium dimethyl
Methylphenylsilanediylbis(2-ethyl-4,5-benzoindenyl)zirconium dimethyl
Methylphenylsilanediylbis(4,5-dihydro-8-methyl-7H-cyclopent[e]acenaphthylen-7-ylidene)zirconium dimethyl
Methylphenyisilanediyl(2-methyl-4,5benzoindenyl)(2-methyl-4-phenylindenyl)zirconium dimethyl
Methylphenylsilanediyl(2-ethyl-4,5-benzoindenyl)(2-methyl-4-phenylindenyl)zirconium dimethyl
Methylphenylsilanediyl(2-methyl-4,5-benzoindenyl)(2-ethyl-4-phenylindenyl)zirconium dimethyl
Methylphenylsilanediyl(2-ethyl-4,5-benzoindenyl)(2-ethyl-4-naphthylindenyl)zirconium dimethyl
Methylphenylsilanediyl(2-methylindenyl)(4-phenylindenyl)zirconium dimethyl
Methylphenylsilanediylbis(2-methyl-4-phenylindenyl)zirconium dimethyl
Methylphenylsilanediylbis(2-ethyl-4-phenylindenyl)zirconium dimethyl
Methylphenyisilanediylbis(2-methyl-4,6-diisopropylindenyl)zirconium dimethyl
Methylphenylsilanediylbis(2-ethyl-4,6-diisopropylindenyl)zirconium dimethyl
Methylphenylsilanediylbis(2-methyl-4-naphthylindenyl)zirconium dimethyl
Methylphenylsilanediylbis(2-ethyl-4-naphthylindenyl)zirconium dimethyl
Diphenylsilanediylbis(indenyl)zirconium dimethyl
Diphenylsilanediylbis(2-methylindenyl)zirconium dimethyl
Diphenylsilanediylbis(2-ethylindenyl)zirconium dimethyl
Diphenylsilanediyl(cyclopentadienyl)(indenyl)zirconium dimethyl
Diphenylsilanediylbis(2-methyl-4,5-benzoindenyl)zirconium dimethyl
Diphenylsilanediylbis(2-ethyl-4,5-benzoindenyl)zirconium dimethyl
Diphenylsilanediyl(2-methyl-4,5-benzoindenyl)(2-methyl-4-phenylindenyl)zirconium dimethyl
Diphenylsilanediyl(2-ethyl-4,5-benzoindenyl)(2-methyl-4-phenylindenyl)zirconium dimethyl
Diphenylsilanediyl(2-methyl-4,5-benzoindenyl)(2-ethyl-4-phenylindenyl)zirconium dimethyl
Diphenylsilanediyl(2-ethyl-4,5-benzoindenyl)(2-ethyl-4-naphthylindenyl)zirconium dimethyl
Diphenylsilanediyl(2-methylindenyl)(4-phenylindenyl)zirconium dimethyl
Diphenylsilanediylbis(2-methyl-4-phenylindenyl)zirconium dimethyl
Diphenylsilanediylbis(2-ethyl-4-phenylindenyl)zirconium dimethyl
Diphenylsilanediylbis(2-methyl-4,6-diisopropylindenyl)zirconium dimethyl
Diphenylsilanediylbis(2-ethyl-4,6-diisopropylindenyl)zirconium dimethyl
Diphenylsilanediylbis(2-methyl-4-naphthylindenyl)zirconium dimethyl
Diphenylsilanediylbis(2-ethyl4-naphthylindenyl)zirconium dimethyl
1-Silacyclopentane-1,1-bis(indenyl)zirconium dimethyl
1-Silacyclopentane-1,1-bis(2-methylindenyl)zirconium dimethyl
1-Silacyclopentane-1,1-bis(2-ethylindenyl)zirconium dimethyl
1-Silacyclopentane-1,1-bis(2-methyl-4,5-benzoindenyl)zirconium dimethyl
1-Silacyclopentane-1,1-bis(2-ethyl-4,5-benzoindenyl)zirconium dimethyl
1-Silacyclopentane-1-(2-methyl-4,5-benzoindenyl)-1-(2-methyl-4-phenylindenyl)zirconium dimethyl
1-Silacyclopentane-1-(2-ethyl-4,5-benzoindenyl)-1-(2-methyl-4-phenylindenyl)zirconium dimethyl
1-Silacyclopentane-1-(2-methyl-4,5-benzoindenyl)-1-(2-ethyl-4-phenylindenyl)zirconium dimethyl
1-Silacyclopentane-1-(2-ethyl-4,5-benzoindenyl)-1-(2-ethyl-4-naphthylindenyl)zirconium dimethyl
1-Silacyclopentane-1-(2-methylindenyl)-1-(4-phenylindenyl)zirconium dimethyl 1-Silacyclopentane-1,1-bis(2-methyl-4-phenylindenyl)zirconium dimethyl
1-Silacyclopentane-1,1-bis(2-ethyl-4-phenylindenyl)zirconium dimethyl
1-Silacyclopentane-1,1-bis(2-methyl-4,6-diisopropylindenyl)zirconium dimethyl
1-Silacyclopentane-1,1-bis(2-ethyl-4,6-diisopropylindenyl)zirconium dimethyl
1-Silacyclopentane-1,1-bis(2-methyl-4-naphthylindenyl)zirconium dimethyl
1-Silacyclopentane-1,1-bis(2-ethyl-4-naphthylindenyl)zirconium dimethyl
Ethylene-1,2-bis(indenyl)zirconium dimethyl
Ethylene-1,2-bis(tetrahydroindenyl)zirconium dimethyl
Ethylene-1-cyclopentadienyl-2-(1-indenyl)zirconium dimethyl
Ethylene-1-cyclopentadienyl-2-(2-indenyl)zirconium dimethyl
Ethylene-1-cyclopentadienyl-2-(2-ethyl-1-indenyl)zirconium dimethyl
Ethylene-1,2-bis(2-methylindenyl)zirconium dimethyl
Ethylene-1,2-bis(2-ethylindenyl)zirconium dimethyl
Ethylene-1,2-bis(2-methyl-4,5-benzoindenyl)zirconium dimethyl
Ethylene-1,2-bis(2-ethyl-4,5-benzoindenyl)zirconium dimethyl
Ethylene-1,2-bis(4,5-dihydro-8-methyl-7H-cyclopent[e]acenaphthylen-7-ylidene)zirconium dimethyl
Ethylene-1-(2-methyl-4,5-benzoindenyl)-2-(2-methyl-4-phenylindenyl)zirconium dimethyl
Ethylene-1-(2-ethyl-4,5-benzoindenyl)-2-(2-methyl-4-phenylindenyl)zirconium dimethyl
Ethylene-1-(2-methyl-4,5-benzoindenyl)-2-(2-ethyl-4-phenylindenyl)zirconium dimethyl
Ethylene-1-(2-ethyl-4,5-benzoindenyl)-2(2-ethyl-4-naphthylindenyl)zirconium dimethyl
Ethylene-1-(2-methylindenyl)-2-(4-phenylindenyl)zirconium dimethyl
Ethylene-1,2-bis(2-methyl-4-phenylindenyl)zirconium dimethyl
Ethylene-1,2-bis(2-ethyl-4-phenylindenyl)zirconium dimethyl
Ethylene-1,2-bis(2-methyl-4,6-diisopropylindenyl)zirconium dimethyl
Ethylene-1,2-bis(2-ethyl-4,6-diisopropylindenyl)zirconium dimethyl
Ethylene-1,2-bis(2-methyl-4-naphthylindenyl)zirconium dimethyl
Ethylene-1,2-bis(2-ethyl-4-naphthylindenyl)zirconium dimethyl
Propylene-2,2-bis(indenyl)zirconium dimethyl
Propylene-2-cyclopentadienyl-2-(1-indenyl)zirconium dimethyl
Propylene-2-cyclopentadienyl-2-(4-phenyl-1-indenyl)zirconium dimethyl
Propylene-2-cyclopentadienyl-2-(9-fluorenyl)zirconium dimethyl
Propylene-2-cyclopentadienyl-2-(2,7-dimethoxy-9-fluorenyl)zirconium dimethyl
Propylene-2-cyclopentadienyl-2-(2,7-di-tert-butyl-9-fluorenyl)zirconium dimethyl
Propylene-2-cyclopentadienyl-2-(2,7-dibromo-9-fluorenyl)zirconium dimethyl
Propylene-2-cyclopentadienyl-2-(2,7-diphenyl-9-fluorenyl)zirconium dimethyl
Propylene-2-cyclopentadienyl-2-(2,7-dimethyl-9-fluorenyl)zirconium dimethyl
Propylene-2-(3-methylcyclopentadienyl)-2-(2,7-dibutyl-9-fluorenyl)zirconium dimethyl
Propylene-2-(3-tert-butylcyclopentadienyl)-2-(2,7-dibutyl-9-fluorenyl)zirconium dimethyl
Propylene-2-(3-trimethylsilylcyclopentadienyl)-2-(3,6-di-tert-butyl-9-fluorenyl)zirconium dimethyl
Propylene-2-cyclopentadienyl-2-[2,7-bis(3-buten-1-yl)-9-fluorenyl]zirconium dimethyl
Propylene-2-cyclopentadienyl-2-(3-tert-butyl-9-fluorenyl)zirconium dimethyl
Propylene-2,2-bis(tetrahydroindenyl)zirconium dimethyl
Propylene-2,2-bis(2-methylindenyl)zirconium dimethyl
Propylene-2,2-bis(2-ethylindenyl)zirconium dimethyl
Propylene-2,2-bis(2-methyl-4,5-benzoindenyl)zirconium dimethyl
Propylene-2,2-bis(2-ethyl-4,5-benzoindenyl)zirconium dimethyl
Propylene-2,2-bis(4,5-dihydro-8-methyl-7H-cyclopent[e]acenaphthylen-7-ylidene)zirconium dimethyl
Propylene-2-(2-methyl-4,5-benzoindenyl)-2-(2-methyl-4-phenylindenyl)zirconium dimethyl
Propylene-2-(2-ethyl-4,5-benzoindenyl)-2-(2-methyl-4-phenylindenyl)zirconium dimethyl
Propylene-2-(2-methyl-4,5-benzoindenyl)-2-(2-ethyl-4-phenylindenyl)zirconium dimethyl
Propylene-2-(2-ethyl-4,5-benzoindenyl)-2-(2-ethyl-4-naphthylindenyl)zirconium dimethyl
Propylene-2-(2-methylindenyl)-2-(4-phenylindenyl)zirconium dimethyl
Propylene-2,2-bis(2-methyl-4-phenylindenyl)zirconium dimethyl
Propylene-2,2-bis(2-ethyl-4-phenylindenyl)zirconium dimethyl
Propylene-2,2-bis(2-methyl-4,6-diisopropylindenyl)zirconium dimethyl
Propylene-2,2-bis(2-ethyl-4,6-diisopropylindenyl)zirconium dimethyl
Propylene-2,2-bis(2-methyl-4-naphthylindenyl)zirconium dimethyl
Propylene-2,2-bis(2-ethyl-4-naphthylindenyl)zirconium dimethyl
1,6-Bis[methylsilylbis(2-methyl-4-phenylindenyl)zirconium dimethyl]hexane
1,6-Bis[methylsilylbis(2-methyl-4,5-benzoindenyl)zirconium dimethyl]hexane
1,6-Bis[methylsilylbis(2-ethyl-4-phenylindenyl)zirconium dimethyl]hexane
1,6-Bis[methylsilylbis(2-methyl-4-naphthylindenyl)zirconium dimethyl]hexane
1,6-Bis[methylsilylbis(2-methyl-4,6-diisopropylindenyl)zirconium dimethyl]hexane
1,6-Bis[methylsiyl(2-methyl-4-phenylindenyl)(4,5-benzoindenyl)zirconium dimethyl]hexane
1-[Methylsilylbis(tetrahydroindenyl)zirconium dimethyl]6-[ethylstannyl(cyclopentadienyl)-(fluorenyl)zirconium dimethyl]hexane
1,6-Disila-1,1,6,6-tetramethyl-1,6-bis[methylsilylbis(2-methyl-4-phenylindenyl)zirconium dimethyl]hexane
1,4-Disila-1,4-bis[methylsilylbis(2-methyl-4-phenylindenyl)zirconium dimethyl]cyclohexane
[1,4-Bis(1-indenyl)-1,1,4,4-tetramethyl-1,4-disilabutane]bis(pentamethylcyclopentadienylzirconium dimethyl)
[1,4-Bis(9-fluorenyl)-1,1,4,4-tetramethyl-1,4-disilabutane]bis(cyclopentadienylzirconium dimethyl)
[1,4-Bis(1-indenyl)-1,1,4,4-tetramethyl-1,4-disilabutane]bis(cyclopentadienylzirconium dimethyl)
[1-(1-indenyl)-6-(2-phenyl-1-indenyl)-1,1,6,6-tetraethyl-1,6-disila-4-oxahexane]bis(tert-butylcyclopentadienylzirconium dimethyl)

[1,10-Bis(2,3-dimethyl-1-indenyl)-1,1,10,10-tetramethyl-1,10-digermadecane]bis(2-methyl-4-phenylindenylzirconium dimethyl)
(1-Methyl-3-tert-butylcyclopentadienyl)(1-phenyl-4-methoxy-7-chlorofluorenyl)zirconium dimethyl
(4,7-Dichloroindenyl)(3,6-dimesitylfluorenyl)zirconium dimethyl
Bis(2,7-di-tert-butyl-9-cyclohexylfluorenyl)zirconium dimethyl
(2,7-Dimesitylfluorenyl)[2,7-bis(1-naphthyl)fluorenyl]zirconium dimethyl
Dimethylsilylbis(fluorenyl)zirconium dimethyl
Dibutylstannylbis(2-methylfluorenyl)zirconium dimethyl
1,1,2,2-Tetraethyldisilanediyl(2-methylindenyl)(4-phenylfluorenyl)zirconium dimethyl
Propylene-1-(2-indenyl)-2-(9-fluorenyl)zirconium dimethyl
1,1-Dimethyl-1-silaethylenebis(fluorenyl)zirconium dimethyl
[4-(Cyclopentadienyl)-4,7,7-trimethyl(tetrahydroindenyl)]zirconium dimethyl
[4-(Cyclopentadienyl)-4,7-dimethyl-7-phenyl(5,6-dimethyltetrahydroindenyl)]zirconium dimethyl
[4-(Cyclopentadienyl)-4,7-dimethyl-7-(1-naphthyl)(7-phenyltetrahydroindenyl)]zirconium dimethyl
[4-(Cyclopentadienyl)-4,7-dimethyl-7-butyl(6,6-diethyltetrahydroindenyl)]zirconium dimethyl
[4-(3-tert-Butylcyclopentadienyl)-4,7,7-trimethyl(tetrahydroindenyl)]zirconium dimethyl
[4-(1-Indenyl)-4,7,7-trimethyl(tetrahydroindenyl)]zirconium dimethyl
Bis(cyclopentadienyl)hafnium dimethyl
Bis(indenyl)vanadium dimethyl
Bis(fluorenyl)scandium dimsthyl
(Indenyl)(fluorenyl)niobium dimethyl
(2-Methyl-7-naphthylindenyl)(2,6-di-tert-butylfluorenyl)titanium dimethyl
(Pentamethylcyclopentadienyl)(tetrahydroindenyl)hafnium bromide methyl
(Cyclopentadienyl)(1-octen-8-ylcyclopentadienyl)hafnium dimethyl
(Indenyl)(2buten-4-ylcyclopentadienyl)titanium dimethyl
[1,3-Bis(trimethylsilyl)cydopentadienyl](3,4-benzofluorenyl)niobium dimethyl
Dimethylsilanediylbis(indenyl)titanium dimethyl
Dimethylsilanediylbis(tetrahydroindenyl)hafnium dimethyl
Dimethylsilanediyl(cyclopentadienyl)(indenyl)titanium dimethyl
Dimethylsilanediylbis(2-methylindenyl)hafnium dimethyl
Dimethylsilanediylbis(2-ethylindenyl)scandium methyl
Dimethylsilanediylbis(2-butyl-4,5-benzoindenyl)niobium dimethyl
Dimethylsilanediylbis(2-ethyl-4,5-benzoindenyl)titanium dimethyl
Dimethylsilanediylbis(4,5-dihydro-8-methyl-7H-cyclopent[e]acenaphthylen-7-ylidene)titanium dimethyl
Dimethylsilanediyl(2-methyl-4,5-benzoindenyl)(2-methyl-4-phenylindenyl)titanium dimethyl
Dimethylsilanediyl(2-ethyl-4,5-benzoindenyl)(2-methyl-4-phenylindenyl)hafnium dimethyl
Dimethylsilanediyl(2-methyl-4,5-benzoindenyl)(2-ethyl-4-phenylindenyl)scandium methyl
Dimethylsilanediyl(2-ethyl-4,5-benzoindenyl)(2-ethyl-4-naphthylindenyl)titanium dimethyl
Dimethylsilanediyl(2-methylindenyl)(4-phenylindenyl)hafnium dimethyl
Dimethylsilanediylbis(2-methyl-4-phenylindenyl)niobium dimethyl
Dimethylsilanediylbis(2-ethyl-4-phenylindenyl)vanadium dimethyl
Dimethylsilanediylbis(2-methyl-4,6-diisopropylindenyl)hafnium dimethyl
Dimethylsilanediylbis(2-ethyl-4,6-diisopropylindenyl)vanadium dimethyl
Dimethylsilanediylbis(2-methyl-4-naphthylindenyl)hafnium bromide methyl
Dimethylsilanediylbis(2-ethyl-4-naphthylindenyl)titanium dimethyl
Methylphenylsilanediylbis(indenyl)titanium dimethyl
Methylphenylsilanediyl(cyclopentadienyl)(indenyl)hafnium dimethyl
Methylphenylsilanediylbis(tetrahydroindenyl)hafnium dimethyl
Methylphenylsilanediylbis(2-methylindenyl)titanium dimethyl
Methylphenylsilanediylbis(2-ethylindenyl)hafnium dimethyl
Methylphenylsilanediylbis(2-methyl-4,5-benzoindenyl)hafnium dimethyl
Methylphenylsilanediylbis(2-ethyl4,5-benzoindenyl)vanadium dimethyl
Methylphenylsilanediylbis(4,5dihydro-8-methyl-7H-cyclopent[e]acenaphthylen-7-ylidene)titanium dimethyl
Methylphenyisilanediyl(2-methyl-4,5-benzoindenyl)(2-methyl-4-phenylindenyl)titanium bromide methyl
Methylphenylsilanediyl(2-ethyl-4,5-benzoindenyl)(2-methyl-4-phenylindenyl)titanium dimethyl
Methylphenylsilanediyl(2-methyl-4,5-benzoindenyl)(2-ethyl-4-phenylindenyl)hafnium dimethyl
Methylphenylsilanediyl(2-ethyl-4,5-benzoindenyl)(2-ethyl-4-naphthylindenyl)hafnium dimethyl
Methylphenylsilanediyl(2-methylindenyl)(4-phenylindenyl)titanium dimethyl
Methylphenylsilanediylbis(2-methyl-4-phenylindenyl)hafnium dimethyl
Methylphenylsilanediylbis(2-ethyl-4-phenylindenyl)vanadium dimethyl
Methylphenyisilanediylbis(2-methyl-4,6-diisopropylindenyl)titanium dimethyl
Methylphenylsilanediylbis(2-ethyl-4,6-diisopropylindenyl)hafnium dimethyl
Methylphenylsilanediylbis(2-methyl-4-naphthylindenyl)hafnium dimethyl
Methylphenylsilanediylbis(2-ethyl-4-naphthylindenyl)titanium dimethyl
Diphenylsilanediylbis(indenyl)titanium dimethyl
Diphenylsilanediylbis(2-methylindenyl)hafnium dimethyl
Diphenylsilanediylbis(2-ethylindenyl)titanium dimethyl
Diphenylsilanediyl(cyclopentadienyl)(indenyl)hafnium dimethyl
Diphenylsilanediylbis(2-methyl-4,5-benzoindenyl)titanium dimethyl
Diphenyisilanediylbis(2-ethyl-4,5-benzoindenyl)hafnium dimethyl
Diphenylsilanediyl(2-methyl-4,5-benzoindenyl)(2-methyl-4-phenylindenyl)hafnium dimethyl
Diphenylsilanediyl(2-ethyl-4,5-benzoindenyl)(2-methyl-4-phenylindenyl)titanium dimethyl
Diphenylsilanediyl(2-methyl-4,5-benzoindenyl)(2-ethyl-4-phenylindenyl)hafnium dimethyl
Diphenylsilanediyl(2-ethyl-4,5-benzoindenyl)(2-ethyl-4-naphthylindenyl)titanium dimethyl
Diphenylsilanediyl(2-methylindenyl)(4-phenylindenyl)titanium dimethyl
Diphenylsilanediylbis(2-methyl-4-phenylindenyl)titanium dimethyl Diphenylsilanediylbis(2-ethyl-4-phenylindenyl)hafnium dimethyl
Diphenylsilanediylbis(2-methyl-4,6-diisopropylindenyl)hafnium dimethyl
Diphenylsilanediylbis(2-ethyl-4,6-diisopropylindenyl)hafnium dimethyl
Diphenylsilanediylbis(2-methyl-4-naphthylindenyl)hafnium dimethyl
Diphenylsilanediylbis(2-ethyl-4-naphthylindenyl)titanium dimethyl
1-Silacyclopentane-1,1-bis(indenyl)hafnium dimethyl
1-Silacyclopentane-1,1-bis(2-methylindenyl)hafnium dimethyl
1-Silacyclopentane-1,1-bis(2-ethylindenyl)hafnium dimethyl
1-Silacyclopentane-1,1-bis(2-methyl-4,5-benzoindenyl)titanium dimethyl
1-Silacyclopentane-1,1-bis(2-ethyl-4,5-benzoindenyl)hafnium dimethyl
1-Silacydopentane-1-(2-methyl-4,5-benzoindenyl)-1-(2-methyl-4-phenylindenyl)scandium methyl
1-Silacyclopentane-1-(2-ethyl-4,5-benzoindenyl)-1-(2-methyl-4-phenylindenyl)hafnium dimethyl
1-Silacyclopentane-1-(2-methyl-4,5-benzoindenyl)-1-(2-ethyl-4-phenylindenyl)titanium dimethyl
1-Silacyclopentane-1-(2-ethyl-4,5-benzoindenyl)-1-(2-ethyl-4-naphthylindenyl)hafnium dimethyl
1-Silacyclopentane-1-(2-methylindenyl)-1-(4-phenylindenyl)hafnium dimethyl
1-Silacyclopentane-1,1-bis(2-methyl-4-phenylindenyl)hafnium dimethyl
1-Silacyclopentane-1,1-bis(2-ethyl-4-phenylindenyl)titanium bromide methyl
1-Silacyclopentane-1,1-bis(2-methyl-4,6-diisopropylindenyl)titanium dimethyl
1-Silacyclopentane-1,1-bis(2-ethyl-4,6-diisopropylindenyl)titanium dimethyl
1-Silacyclopentane-1,1-bis(2-methyl-4-naphthylindenyl)scandium methyl
1-Silacyclopentane-1,1-bis(2-ethyl-4-naphthylindenyl)hafnium dimethyl
Ethylene-1,2-bis(indenyl)scandium methyl
Ethylene-1,2-bis(tetrahydroindenyl)titanium dimethyl
Ethylene-1-cyclopentadienyl-2-(1-indenyl)hafnium dimethyl
Ethylene-1-cyclopentadienyl-2-(2-indenyl)titanium bromide methyl
Ethylene-1-cyclopentadienyl-2-(2-methyl-1-indenyl)hafnium dimethyl
Ethylene-1,2-bis(2-methylindenyl)hafnium dimethyl
Ethylene-1,2-bis(2-ethylindenyl)hafnium dimethyl
Ethylene-1,2-bis(2-methyl-4,5-benzoindenyl)hafnium dimethyl
Ethylene-1,2-bis(2-ethyl-4,5-benzoindenyl)titanium dimethyl
Ethylene-1,2-bis(4,5-dihydro-8-methyl-7H-cyclopent[e]acenaphthylen-7-ylidene)titanium dimethyl
Ethylene-1-(2-methyl-4,5-benzoindenyl)-2-(2-methyl-4-phenylindenyl)titanium dimethyl
Ethylene-1-(2-ethyl-4,5-benzoindenyl)-2-(2-methyl-4-phenylindenyl)titanium dimethyl
Ethylene-1-(2-methyl-4,5-benzoindenyl)-2-(2-ethyl-4-phenylindenyl)scandium methyl
Ethylene-1-(2-ethyl-4,5-benzoindenyl)-2-(2-ethyl-4-naphthylindenyl)hafnium dimethyl
Ethylene-1-(2-methylindenyl)-2-(4-phenylindenyl)titanium dimethyl
Ethylene-1,2-bis(2-methyl-4-phenylindenyl)hafnium dimethyl
Ethylene-1,2-bis(2-phenylindenyl)hafnium dimethyl
Ethylene-1,2-bis(2-methyl-4,6-diisopropylindenyl)hafnium dimethyl
Ethylene-1,2-bis(2-ethyl-4,6-diisopropylindenyl)titanium dimethyl
Ethylene-1,2-bis(2-methyl-4-naphthylindenyl)titanium dimethyl
Ethylene-1,2-bis(2-ethyl-4-naphthylindenyl)hafnium dimethyl
Propylene-2,2-bis(indenyl)hafnium dimethyl
Propylene-2-cyclopentadienyl-2-(1-indenyl)titanium dimethyl
Propylene-2-cyclopentadienyl-2-(4-phenyl-1-indenyl)titanium dimethyl
Propylene-2-cyclopentadienyl-2-(9-fluorenyl)hafnium dimethyl
Propylene-2-cyclopentadienyl-2-(2,7-dimethoxy-9-fluorenyl)hafnium dimethyl
Propylene-2-cyclopentadienyl-2-(2,7-di-tert-butyl-9-fluorenyl)hafnium dimethyl
Propylene-2-cyclopentadienyl-2-(2,7-dibromo-9-fluorenyl)titanium dimethyl
Propylene-2-cyclopentadienyl-2-(2,7-diphenyl-9-fluorenyl)hafnium dimethyl
Propylene-2-cyclopentadienyl-2-(2,7-dimethyl-9-fluorenyl)titanium dimethyl
Propylene-2-(3-methylcyclopentadienyl)-2-(2,7-dibutyl-9-fluorenyl)hafnium dimethyl
Propylene-2-(3-tert-butylcyclopentadienyl)-2-(2,7-dibutyl-9-fluorenyl)titanium dimethyl
Propylene2-(3-trimethylsilylcyclopentadienyl)-2-(3,6-di-tert-butyl-9-fluorenyl)titanium dimethyl
Propylene-2-cyclopentadienyl-2-[2,7-bis(3-buten-1-yl)-9-fluorenyl]hafnium dimethyl
Propylene-2-cyclopentadienyl-2-(3tert-butyl-9-fluorenyl)titanium dimethyl
Propylene-2,2-bis(tetrahydroindenyl)hafnium dimethyl
Propylene-2,2-bis(2-methylindenyl)hafnium dimethyl
Propylene-2,2-bis(2-ethylindenyl)titanium dimethyl
Propylene-2,2-bis(2-methyl-4,5-benzoindenyl)titanium dimethyl
Propylene-2,2-bis(2-ethyl-4,5-benzoindenyl)hafnium dimethyl
Propylene-2,2-bis(4,5-dihydro-8-methyl-7H-cyclopent[e]acenaphthylen-7-ylidene)hafnium dimethyl
Propylene-2-(2-methyl-4,5-benzoindenyl)-2-(2-methyl-4-phenylindenyl)hafnium dimethyl
Propylene-2-(2-ethyl-4,5-benzoindenyl)-2-(2-methyl-4-phenylindenyl)titanium dimethyl
Propylene-2-(2-methyl-4,5-benzoindenyl)-2-(2-ethyl-4-phenylindenyl)hafnium dimethyl
Propylene-2-(2-ethyl-4,5-benzoindenyl)-2-(2-ethyl-4-naphthylindenyl)titanium dimethyl
Propylene-2-(2-methylindenyl)-2-(4-phenylindenyl)hafnium dimethyl
Propylene-2,2-bis(2-methyl-4-phenylindenyl)titanium dimethyl
Propylene-2,2-bis(2-ethyl-4-phenylindenyl)hafnium dimethyl
Propylene-2,2-bis(2-methyl-4,6-diisopropylindenyl)titanium dimethyl
Propylene-2,2-bis(2-ethyl-4,6-diisopropylindenyl)hafnium dimethyl
Propylene-2,2-bis(2-methyl-4-naphthylindenyl)titanium dimethyl Propylene-2,2-bis(2-ethyl-4-naphthylindenyl)titanium dimethyl
1,6-Bis[methylsilylbis(2-methyl-4-phenylindenyl)hafnium dimethyl]hexane
1,6-Bis[methylsitylbis(2-methyl-4,5-benzoindenyl)titanium dimethyl]hexane
1,6-Bis[methylsilylbis(2-ethyl-4-phenylindenyl)hafnium dimethyl]hexane
1,6-Bis[methylsilylbis(2-methyl-4-naphthylindenyl)titanium dimethyl]hexane
1,6-Bis[methylsilylbis(2-methyl-4,6-diisopropylindenyl)hafnium dimethyl]hexane
1,6-Bis[methylsilyl(2-methyl-4-phenylindenyl)(4,5-benzoindenyl)titanium dimethyl]hexane
1-[Methylsilylbis(tetrahydroindenyl)hafnium dimethyl]-6-[ethylstannyl(cyclopentadienyl)-(fluorenyl)titanium dimethyl]hexane
1,6-Disila-1,1,6,6-tetramethyl-1,6-bis[methylsilylbis(2-methyl-4-phenylindenyl)hafnium dimethyl]hexane
1,4-Disila-1,4-bis[methylsilylbis(2-methyl-4-phenylindenyl)hafnium dimethyl]cyclohexane
[1,4-Bis(1-indenyl)-1,1,4,4-tetramethyl-1,4-disilabutane]bis(pentamethylcyclopentadienylhafnium dimethyl)
[1,4-Bis(9-fluorenyl)-1,1,4,4-tetramethyl-1,4-disilabutane]bis(cyclopentadienylhafnium dimethyl)
[1,4-Bis(1-indenyl)-1,1,4,4-tetramethyl-1,4-disilabutane]bis(cydopentadienyltitanium dimethyl)
[1-(1-indenyl)-6-(2-phenyl-1-indenyl)-1,1,6,6-tetraethyl-1,6-disila-4-oxahexane]bis(tert-butylcyclopentadienyltitanium dimethyl)
[1,10-Bis(2,3-dimethyl-1-indenyl)-1,1,10,10-tetramethyl-1,10-digermadecane]bis(2-methyl-4-phenylindenylhafnium dimethyl)
(1-Methyl-3-tert-butylcyclopentadienyl)(1-phenyl-4-methoxy-7-chlorofluorenyl)titanium dimethyl
(4,7-Dichloroindenyl)(3,6-dimesitylfluorenyl)titanium dimethyl Bis(2,7-di-tert-butyl-9-cyclohexylfluorenyl)hafnium dimethyl
(2,7-Dimesitylfluorenyl)[2,7-bis(1-naphthyl)fluorenyl]hafnium dimethyl
Dimethylsilylbis(fluorenyl)titanium dimethyl
Dibutylstannylbis(2-methylfluorenyl)hafnium dimethyl
1,1,2,2-Tetraethyidisilanediyl(2-methylindenyl)(4-phenylfluorenyl)titanium dimethyl
Propylene-1-(2-indenyl)-2-(9-fluorenyl)hafnium dimethyl
1,1-Dimethyl-1-silaethylenebis(fluorenyl)titanium dimethyl
[4-(Cyclopentadienyl)-4,7,7-trimethyl(tetrahydroindenyl)]titanium dimethyl
[4-(Cyclopentadienyl)-4,7-dimethyl-7-phenyl(5,6-dimethyltetrahydroindenyl)]hafnium dimethyl
[4-(Cyclopentadienyl)-4,7-dimethyl-7-(1-naphthyl)(7-phenyltetrahydroindenyl)]titanium dimethyl
[4-(Cyclopentadienyl)-4,7-dimethyl-7-butyl(6,6-diethyltetrahydroindenyl)]hafnium dimethyl
[4-(3-tert-Butylcyclopentadienyl)-4,7,7-trimethyl(tetrahydroindenyl)]hafnium dimethyl
[4-(1-Indenyl)-4,7,7-trimethyl(tetrahydroindenyl)]titanium dimethyl
Bis(cyclopentadienyl)zirconium dichloride
Bis(indenyl)zirconium dichloride
Bis(fluorenyl)zirconium dichloride
(Indenyl)(fluorenyl)zirconium dichloride
Bis(cyclopentadienyl)titanium dichloride
Dimethylsilanediylbis(indenyl)zirconium dichloride
Dimethylsilanediylbis(tetrahydroindenyl)zirconium dichloride
Dimethylsilanediylbis(cyclopentadienyl)(indenyl)zirconium dichloride
Dimethylsilanediylbis(2-methylindenyl)zirconium dichloride
Dimethylsilanediylbis(2-ethylindenyl)zirconium dichloride
Dimethylsilanediylbis(2-methyl-4,5-benzoindenyl)zirconium dichloride
Dimethylsilanediylbis(2-ethyl-4,5-benzoindenyl)zirconium dichloride
Dimethylsilanediylbis(2-methyl-4-phenylindenyl)zirconium dichloride
Dimethylsilanediylbis(2-ethyl-4-phenylindenyl)zirconium dichloride
Dimethylsilanediylbis(2-methyl-4,6-diisopropylindenyl)zirconium dichloride
Ethylene-1,2-bis(indenyl)zirconium dichloride
Ethylene-1,2-bis(tetrahydroindenyl)zirconium dichloride
Ethylene-1,2-bis(2-methylindenyl)zirconium dichloride
Ethylene-1,2-bis(2-ethylindenyl)zirconium dichloride
Ethylene-1,2-bis(2-methyl-4,5-benzoindenyl)zirconium dichloride
Ethylene-1,2-bis(2-methyl-4-phenylindenyl)zirconium dichloride
Ethylene-1,2-bis(2-ethyl-4-phenylindenyl)zirconium dichloride
Ethylene-1,2-bis(2-methyl-4,6-diisopropylindenyl)zirconium dichloride
Propylene-2,2-bis(indenyl)zirconium dichloride
Propylene-2,2-(cyclopentadienyl)(indenyl)zirconium dichloride
Propylene-2,2-cyclopentadoenyl)(fluorenyl)zirconium dichloride
Bis(cyclopentadienyl)($\eta^4$-butadiene)zirconium
Bis(methylcyclopentadienyl)($\eta^4$-butadiene)zirconium
Bis(n-butyl-cyclopentadienyl)($\eta^4$-butadiene)zirconium
Bisindenyl($\eta^4$-butadiene)zirconium
(tert.butylamido)dimethyl(tetramethyl-$\eta^5$-cyclopentadienyl)silane-($\eta^4$-butadiene)zirconium
Bis(2-methylbenzoindenyl)($\eta^4$-butadiene)zirconium
Dimethylsilanediylbis(2-methylindeny)($\eta^4$-butadiene)zirconium
Dimethylsilanediylbisindenyl)($\eta^4$-butadiene)zirconium
Dimethylsilanediylbis(2-methylbenzoindenyl)($\eta^4$-butadiene)zirconium
Dimethylsilanediyl(2-methylbenzoindenyl)(2-methylindenyl)-($\eta^4$-butadiene)zirconium
Dimethylsilanediyl(2-methylbenzoindenyl)(2-methyl-4-phenylindenyl)-($\eta^4$-butadiene)zirconium
Dimethylsilanediyl(2-methylindenyl)(4-phenylindenyl)($\eta^4$-butadiene)-zirconium
Dimethylsilanediylbis(2-methyl-4-phenylindenyl)($\eta^4$-butadiene)zirconium
Dimethylsilanediylbis(2-methyl-4,6-diisopropyl-indenyl)($\eta^4$-butadiene)-zirconium
Dimethylsilanediylbis(2-methyl-4-naphthylindenyl)($\eta^4$-butadiene)-zirconium
Isopropylidene(cyclopentadienyl)(fluorenyl)($\eta^4$-butadiene)zirconium
Isopropylidene(cyclopentadienyl)(indenyl)($\eta^4$-butadiene)zirconium
[4-$\eta^5$-Cyclopentadienyl)-4,7,7-trimethyl-($\eta^5$-4,5,6,7-tetrahydroindenyl)-($\eta^4$-butadiene)zirconium
Dimethylsilanediylbis(2-methylindenyl)($\eta^4$-butadiene)zirconium
Dimethylsilanediylbisindenyl($\eta^4$-butadiene)zirconium
Dimethylsilanediylbis(2-methylbenzoindenyl)($\eta^4$-butadiene)zirconium
Dimethylsilanediyl(2-methylbenzoindenyl)(2-methylindenyl)-($\eta^4$-butadiene)zirconium Dimethylsilanediyl(2-methylbenzoindenyl)(2-methyl-4-phenylindenyl)-(η⁴-butadiene)zirconium
Dimethylsilanediyl(2-methylindenyl)(4-phenylindenyl)(η⁴-butadiene)-zirconium
Dimethylsilanediylbis(2-methyl-4-phenylindenyl)(η⁴-butadiene)zirconium
Dimethylsilanediylbis(2-methyl-4,6-diisopropylindenyl)(η⁴-butadiene)-zirconium
Dimethylsilanediylbis(2-methylindenyl)(η⁴-butadiene)zirconium
Dimethylsilanediylbisindenyl(η⁴-butadiene)zirconium
Dimethylsilanediylbis(2-methylbenzoindenyl)(η⁴-butadiene)zirconium
Dimethylsilanediyl(2-methylbenzoindenyl)(2-methylindenyl)-(η⁴-butadiene)zirconium
Dimethylsilanediyl(2-methylbenzoindenyl)(2-methyl-4-phenylindenyl)-(η⁴-butadiene)zirconium
Dimethylsilanediyl(2-methylindenyl)(4-phenylindenyl)(η⁴-butadiene)-zirconium
Dimethylsilanediylbis(2-methyl-4-phenylindenyl)(η⁴-butadiene)zirconium
Dimethylsilanediylbis(2-methyl-4,6-diisopropylindenyl)(η⁴-butadiene)-zirconium
Dimethylsilanediylbis(2-methyl-4-naphthylindenyl)(η⁴-butadiene)-zirconium
Dimethylsilanediylbis(2-methylindenyl)(η⁴-butadiene)zirconium
Dimethylsilanediylbisindenyl(η⁴-butadiene)zirconium
Dimethylsilanediylbis(2-methylbenzoindenyl)(η⁴-butadiene)zirconium
Dimethylsilanediyl(2-methylbenzoindenyl)(2-methylindenyl)-(η⁴-butadiene)zirconium
Dimethylsilanediyl(2-methylbenzoindenyl)(2-methyl-4-phenylindenyl)-(η⁴-butadiene)zirconium
Dimethylsilanediyl(2-methylindenyl)(4-phenylindenyl)(η⁴-butadiene)-zirconium
Dimethylsilanediylbis(2-methyl-4-phenylindenyl)(η⁴-butadiene)zirconium
Dimethylsilanediylbis(2-methyl-4,6-diisopropylindenyl)(η⁴-butadiene)-zirconium
Dimethylsilanediylbis(2-methyl-4-naphthylindenyl)(η⁴-butadiene)-zirconium
Methylphenylmethylene(fluorenyl)(cyclopentadienyl)(η⁴-butadiene)-zirconium
Diphenylmethylene(fluorenyl)(cyclopentadienyl)(η⁴-butadiene)zirconium
Isopropylidene(3-methylcyclopentadienyl)(fluorenyl)(η⁴-butadiene)-zirconium
Dimethylsilanediyl(3-tert-butylcyclopentadienyl)(fluorenyl)(η⁴-butadiene)-zirconium
Diphenylsilanediyl(3-(trimethylsilyl)cyclopentadienyl)(fluorenyl)-(η⁴-butadiene)zirconium
Phenylmethylsilanediylbis(2-methylindenyl)(η⁴-butadiene)zirconium
Phenylmethylsilanediylbisindenyl(η⁴-butadiene)zirconium
Phenylmethylsilanediylbis(2-methyl-4,5-benzoindenyl)(η⁴-butadiene)-zirconium
Phenylmethylsilanediyl(2-methyl-4,5-benzoindenyl)(2-methylindenyl)(η⁴-butadiene)zirconium
Phenylmethylsilanediyl(2-methyl-4,5-benzoindenyl)(2-methyl-4-phenylindenyl)(η⁴-butadiene)zirconium
Phenylmethylsilanediyl(2-methylindenyl)(4-phenylindeny)(η⁴-butadiene)-zirconium
Phenylmethylsilanediylbis(2-methyl-4-phenylindenyl)(η⁴-butadiene)zirconium
Phenylmethylsilanediylbis(2-ethyl-4-phenylindenyl)(η⁴-butadiene)zirconium
Phenylmethylsilanediylbis(2-methyl-4,6-diisopropylindenyl)-(η⁴-butadiene)zirconium
Phenylmethylsilanediylbis(2-methyl-4-naphthylindenyl)(η⁴-butadiene)-zirconium
Ethylenebis(2-methylindenyl)(η⁴-butadiene)zirconium
Ethylenebisindenyl(η⁴-butadiene)zirconium
Ethylenebis(2-methyl-4,5-benzoindenyl)(η⁴-butadiene)zirconium
Ethylene(2-methyl-4,5-benzoindenyl)(2-methylindenyl)(η⁴-butadiene)-zirconium
Ethylene (2-methyl-4,5-benzoindenyl)(2-methyl-4-phenylindenyl)(η⁴-butadiene)zirconium
Ethylene(2-methylindenyl)(4-phenylindenyl)(η⁴-butadiene)zirconium
Ethylenebis(2-methyl-4,5-benzoindenyl)(η⁴-butadiene)zirconium
Ethylenebis(2-methyl-4-phenylindenyl)(η⁴-butadiene)zirconium
Ethylenebis(2-methyl-4,6-diisopropylindenyl)(η⁴-butadiene)zirconium
Ethylenebis(2-methyl-4-naphthylindenyl)(η⁴-butadiene)zirconium
Ethylenebis(2-ethyl-4-phenylindenyl)(η⁴-butadiene)zirconium
Ethylenebis(2-ethyl-4,6-diisopropylindenyl)(η⁴-butadiene)zirconium
Ethylenebis(2-ethyl-4-naphthylindenyl)(η⁴-butadiene)zirconium
Dimethylsilanediylbis(2-ethyl-4-phenylindenyl)(η⁴-butadiene)zirconium
Dimethylsilanediylbis(2,3,5-trimethylcyclopentadienyl)(η⁴-butadiene)-zirconium
1,6-{Bis[methylsilylbis(2-methyl-4-phenylindenyl)(η⁴-butadiene)-zirconium]}hexane
1,6-{Bis[methylsilylbis(2-ethyl-4-phenylindenyl)(η⁴-butadiene)-zirconium]}hexane
1,6-{Bis[methylsilylbis(2-methyl-4-naphthylindenyl)(η⁴-butadiene)-zirconium]}hexane
1,6-{Bis[methylsilylbis(2-methyl-4,5-benzoindenyl)(η⁴-butadiene)-zirconium]}hexane
1,6-{Bis[methylsilyl-(2-methyl-4-phenylindenyl)(2-methylindenyl)(η⁴-butadiene)zirconium]}hexane
1,6-{Bis[methylsilylbis(2-methyl-4-phenylindenyl)(η⁴-butadiene)-zirconium]}ethane
1,2-{Bis[methylsilylbis(2-ethyl-4-phenylindenyl)(η⁴-butadiene)-zirconium]}ethane
1,2-{Bis[methylsilylbis(2-methyl-4-naphthylindenyl)(η⁴-butadiene)-zirconium]}ethane
1,2-{Bis[methylsilylbis(2-methyl-4,5-benzoindenyl)(η⁴-butadiene)-zirconium]}ethane
1,2-{Bis[methylsilyl(2-methyl-4-phenylindenyl)(2-methylindenyl)(η⁴-butadiene)zirconium]}ethane.

The present invention additionally provides a catalyst comprising at least one novel supported chemical compound as cocatalyst and also at least one transition metal compound $M^1L_x$, for example a metallocene. Also described is a process for preparing an olefin polymer by polymerizing at least one olefin in the presence of the novel catalyst. The polymerization can be a homo- or a copolymerization.

Preference is given to polymerizing olefins of the formula $R^\alpha$—CH=CH—$R^\beta$, in which $R^\alpha$ and $R^\beta$ are identical or different and are a hydrogen atom, a halogen atom, an alkoxy, hydroxyl, alkylhydroxyl, aldehyde, carboxylic acid or carboxylic ester group or a saturated or unsaturated hydrocarbon radical having 1 to 20 C atoms, especially 1 to 10 C atoms, which can be substituted by an alkoxy, hydroxyl, alkylhydroxyl, aldehyde, carboxylic acid of carboxylic ester group, or $R^\alpha$ and $R^\beta$ together with the atoms linking them form one or more rings. Examples of such olefins are 1-olefins such as ethylene, propylene, 1-butene, 1-hexene, 4-methyl-1-pentene, 1-octene, styrene, cyclic olefins such as norbornene, vinylnorbornene, tetracyclododecene, ethylidenenorbornene, dienes, such as 1,3-butadiene or 1,4-hexadiene, biscyclopentadiene or methyl methacrylate.

In particular, propylene are ethylene are homopolymerized or ethylene is copolymerized with one or more $C_3$–$C_{20}$ α-olefins, especially propylene, and/or with one or more $C_4$–$C_{20}$ dienes, especially 1,3-butadiene, or propylene is copolymerized with norbornene and ethylene.

The polymerization is preferably conducted at a temperature from −60 to 300° C., particularly preferably from 30 to 250° C. The pressure is from 0.5 to 2500 bar, preferably from 2 to 1500 bar. The polymerization can be conducted continuously or discontinuously in one or more stages, in solution, in suspension, in the gas phase or in a supercritical medium.

The supported system, as a powder or still with solvent, can be resuspended and, as a suspension in an inert suspension medium, can be metered into the polymerization system.

The novel catalyst can be used to carry out an initial polymerization, preferably using the (or one of the) olefin(s) employed in the polymerization.

To prepare olefin polymers with a broad molecular weight distribution it is preferred to use catalyst systems that comprise two or more different transition metal compounds, metallocenes for instance.

For removing catalyst poisons present in the olefin, purification with an aluminum alkyl, for example trimethylaluminum, triethylaluminum or triisobutylaluminum, is advantageous. Either this purification can be carried out in the polymerization system itself, or before being added to the polymerization system the olefin is brought into contact with the Al compound and then separated again.

As a molar mass regulator and/or to increase the activity, hydrogen is added if required. The overall pressure in the polymerization system is from 0.5 to 2500 bar, preferably from 2 to 1500 bar. At the same time the novel compound is employed in a concentration, based on the transition metal, of from $10^{-3}$ to $10^{-8}$, preferably from $10^{-4}$ to $10^{-7}$, mol of transition metal per $dm^3$ of solvent or per $dm^3$ of reactor volume.

Suitable solvents for the preparation both of the novel supported chemical compound and of the novel catalyst system are aliphatic or aromatic solvents, for example hexane or toluene, ether solvents, for example tetrahydrofuran or diethyl ether, or halogenated hydrocarbons, for example methylene chloride or halogenated aromatic hydrocarbons such as, for example, o-dichlorobenzene.

Prior to the addition of the catalyst system (comprising at least one novel supported chemical compound and at least one transition metal compound (such as a metallocene)) it is possible in addition to add to the reactor another alkylaluminum compound, for example trimethylaluminum, triethylaluminum, triisobutylaluminum, trioctylaluminum or isoprenylaluminum, in order to render the polymerization system inert (for example, to separate off catalyst poisons present in the olefin). This additional compound is added to the polymerization system in a concentration of from 100 to 0.01 mmol of Al per kg of reactor contents. Preference is given to employing triisobutylaluminum and triethylaluminum in a concentration of from 10 to 0.1 mmol of Al per kg of reactor contents, thereby making it possible to keep the molar ratio of Al to M small in the synthesis of a supported catalyst system.

The examples which follow serve to illustrate the invention in more detail.

General information: Preparation and handling of organometallic compounds took place in the absence of air and humidity under argon (Schlenk technique). All solvents required were rendered absolute prior to use by boiling them for several hours over suitable drying agents and then distilling them under argon. The compounds were characterized by $^{19}$F-NMR spectroscopy.

EXAMPLE 1

Chlorobis(pentafluorophenyl)borane 4.69 g (40 mmol) of trichloroborane are condensed at −78° C. in a two-necked flask with mounted dry-ice condensor. 19.31 g (40 mmol) of dimethylbis (pentafluorophenyl)stannane are added rapidly. The mixture is stirred at room temperature for 30 minutes and then for a further 2 hours at 100° C. A very vigorous reaction ensues, and dichlorodimethylstannane is deposited on the condenser as the reaction progresses. The residual dichlorodimethylstannane is removed from the resulting pale brown suspension by sublimation, and the remaining bottom product is subjected to fractional distillation via short column.

$^{19}$F-NMR ($C_6D_6$): δ=−129.5 ppm, −145.4 ppm, −161.3 ppm

EXAMPLE 2

Bis(pentafluorophenyl)borane 6.9 g (20 mmol) of chlorobis(pentafluorophenyl)borane are cooled to −78° C., and 8.9 g (100 mmol) of chlorodimethylsilane are slowly added dropwise. On warming to room temperature, the borane dissolves and a white precipitate is formed. The mixture is subsequently stirred for 1 hour and the precipitate is filtered off and washed with 20 ml of pentane.

$^{19}$F-NMR ($C_6D_6$): δ=−134.8 ppm, −148.4 ppm, 160.7 ppm

EXAMPLE 3

(2,3,5,6-Tetrafluorophenyloxymethyl)triethoxysilane 3.32 g (20 mmol) of 2,3,5,6-tetrafluorophenol are dissolved in 50 ml of toluene, and 8 ml of n-butyllithium (2.5 M in hexane) are added at 0° C. After warming to room temperature, the solution is stirred for a further 2 hours. Then 4.3 g of (chloromethyl)triethoxysilane (20 mmol) are added dropwise and the reaction mixture is boiled under reflux for 6 hours. The resulting suspension is filtered and the solvent is stripped off in vacuo. The pale yellow liquid which remains is subjected to fractional distillation.

$^{19}$F-NMR ($C_6D_6$): δ=−141.04 ppm, −163.34 ppm

EXAMPLE 4

[Bis(pentafluorophenyl)(2,3,5,6-tetrafluorophenyloxymethyl)-triethoxysilane]borane 5.6 g (20 mmol) of (2,3,5,6-tetrafluorophenyloxymethyl) triethoxysilane are dissolved in 50 ml of diethyl ether, and 8 ml of n-butyllithium (2.5 M in hexane) are added at 0° C. After warming to room temperature, the solution is stirred for one hour. The pale yellow solution is then added dropwise to 7.6 g of chlorobis(pentafluorophenyl)borane (20 mmol) in 50 ml of diethyl ether. The resulting suspension is filtered and the solvent is stripped off in vacuo. The white solid which remains is recrystallized from diethyl ether/pentane.

$^{19}$F-NMR (C$_6$D$_6$): δ=−135.8 ppm, −142.04 ppm, −149.9 ppm, −165.34 ppm, 161.8 ppm

EXAMPLE 5

(2,3,5,6-Tetrafluorophenyloxy)chlorodimethylsilane 3.32 g (20 mmol) of 2,3,5,6-tetrafluorophenol are dissolved in 50 ml of toluene, and 8 ml of n-butyllithium (2.5 M in hexane) are added at 0° C. After warming to room temperature, the solution is stirred for 2 hours. Then 2.6 g of dichlorodimethylsilane (20 mmol) are added dropwise. The resulting suspension is filtered and the solvent is stripped off in vacuo. The colorless liquid which remains is subjected to fractional distillation.

$^{19}$F-NMR (C$_6$D$_6$): δ=−143.01 ppm, −164.52 ppm

EXAMPLE 6

[Bis(pentafluorophenyl)(2,3,5,6-tetrafluorophenyloxy)chlorodimethylsilane]borane 2.6 g (10 mmol) of (2,3,5,6-tetrafluorophenyloxy)chlorodimethylsilane are dissolved in 50 ml of diethyl ether, and 4 ml of n-butyllithium (2.5 M in hexane) are added at 0° C. After warming to room temperature, the solution is stirred for one hour. The pale yellow solution is subsequently added dropwise to 3.8 g of chlorobis(pentafluorophenyl)borane (10 mmol) in 50 ml of diethyl ether. The resulting suspension is filtered and the solvent is stripped off in vacuo. The white solid which remains is recrystallized from diethyl ether/pentane.

$^{19}$F-NMR (C$_6$D$_6$): δ=−136.3 ppm, −142.76 ppm, −150.12 ppm, −165.78 ppm, 162.98 ppm

EXAMPLE 7

1,4-Bis(dibromoboryl)-2,3,5,6-tetrafluorobenzene 4.44 g (20 mmol) of solid 1,4-bis(trimethylsilyl)-2,3,5,6-tetrafluorobenzene are added in portions to 10 g (40 mmol) of BBr$_3$. The mixture is heated at 80° C. for 5 hours. Subsequently, volatile Me$_3$SiBr is removed using an oil pump. The resulting product is sufficiently pure to be reacted further directly. The yield is 76%.

EXAMPLE 8

Bis(triphenylcarbenium)-1,4-bis{(tri[pentafluorophenyl])-boryl}-2,3,5,6-tetrafluorobenzene 19 ml of n-BuLi (30 mmol) are added at −78° C. to 3.8 ml of bromopentafluorobenzene (30 mmol) in 50 ml of diethyl ether. The mixture is stirred at this temperature for 1 hour. Then 2.5 g of 1,4-bis(dibromo-boryl)-2,3,5,6tetrafluorobenzene (5 mmol) are added in portions. The suspension obtained is warmed slowly to room temperature, during which a precipitate is deposited. This precipitate is separated off by filtration, and the resulting filtrate is concentrated to dryness in vacuo. The dilithium salt thus obtained is taken up in 100 ml of pentane, and 2.8 g (10 mmol) of triphenylmethyl chloride are added at room temperature. After stirring for 8 hours, the orange/red solid is filtered off. The filtrate is subjected to extraction in methylene chloride in order to separate off the LiCl which is formed. Precipitation with n-pentane gives an orange/red solid (yield 64%).

EXAMPLE 9

Bis(N,N-dimethylanilinium)-1,4-bis{(tri[pentafluorophenyl])-boryl}-2,3,5,6-tetrafluorobenzene 1.22 g of bromopentafluorobenzene (5 mmol) are dissolved in 40 ml of n-hexane, and 3.2 ml (5 mmol) of n-BuLi are added at −78° C. The suspension is stirred at −78° C. for 1 hour. Then 2.1 g of 1,4-bis(dipenta-fluorophenylboryl)-2,3,5,6-tetrafluorobenzene (2.5 mmol) in 40 ml of hexane are added dropwise to the above solution. The suspension obtained is warmed slowly to room temperature, during which a precipitate is deposited. This precipitate is separated off by filtration and the resulting filtrate is concentrated to dryness in vacuo. The resulting dilithium salt is taken up in 40 ml of pentane, and 1.6 g of dimethylanilinium chloride are added at room temperature. After stirring for 8 hours, the white solid is filtered off. The filtrate is subjected to extraction in methylene chloride in order to separate off the LiCl which has formed. Precipitation with pentane gives a white solid (yield 67%).

EXAMPLE 10

Supporting of chlorobis(pentafluorophenyl)borane on silica (cocatalyst A)

5 g of SiO$_2$ (MS 3030, from PQ, dried at 200° C. in a stream of argon) are stirred in 50 ml of pentane, and 3.8 g (10 mmol) of chlorobis(pentafluorophenyl)borane are added at room temperature. The solvent is decanted off and the support material is washed again with pentane. The solvent which remains is subsequently stripped off in vacuo and the support is dried in vacuo.

EXAMPLE 11

Supporting of [bis(pentafluorophenyl)(2,3,5,6-tetrafluorophenyloxymethyl)triethoxysilane]borane on silica (cocatalyst B)

5 g of SiO$_2$ (MS 3030, from PQ, dried at 200° C. in a stream of argon) are stirred in 50 ml of pentane, and 6.9 g (10 mmol) of [bis(pentafluorophenyl)(2,3,5,6-tetrafluorophenyloxymethyl)triethoxysilane]-borane are added at room temperature. The suspension is stirred at room temperature for 1 hour, the solvent is decanted off and the support material is washed again with pentane. The solvent which remains is then stripped off in vacuo and the support is dried in vacuo.

EXAMPLE 12

Supporting of (2,3,5,6-tetrafluorophenyloxy)chlorodimethylsilane on silica (cocatalyst C)

5 g of SiO$_2$ (MS 3030, from PQ, dried at 200° C. in a stream of argon) are stirred in 50 ml of pentane, and 6.0 g (10 mmol) of (2,3,5,6-tetrafluorophenyloxy)chlorodimethylsilane are added at room temperature. The suspension is stirred at room temperature for 1 hour, the solvent is decanted off and the support material is washed again with pentane. The solvent which remains is then stripped off in vacuo and the support is dried in vacuo.

EXAMPLE 13

Supporting of bis(pentafluorophenyl)borane on silica (cocatalyst D)

10 g of $SiO_2$ (MS 3030, from PQ, dried at 200° C. in a stream of argon) were suspended in 40 ml of toluene, and 4.76 g of vinyltriethoxysilane were added at room temperature. This mixture was boiled under reflux for 18 h, then the solid product was filtered off and washed three times with 40 ml of methanol. Residues of solvent were removed under an oil pump vacuum. 6.0 g of bis(pentafluorophenyl)borane were dissolved in 40 ml of toluene, and the modified $SiO_2$ was added in portions. The resulting suspension was stirred at room temperature for 3 h, then the solid constituents were filtered off and washed three times with a little toluene. A free-flowing solid was obtained.

EXAMPLE 14

Modification of a support with trichloroborane 5 g of $SiO_2$ (MS 3030, from PQ, dried at 200° C. in a stream of argon) are added at −40° C. to 1.17 g of trichloroborane. The suspension is allowed to come to room temperature and is stirred for a further 30 minutes. 30 ml of pentane are then added to the suspension, and the mixture is stirred for 10 minutes. The solvent is decanted off and the support material is washed again with pentane. The solvent which remains is then stripped off in vacuo and the support is dried in vacua.

EXAMPLE 15

Preparation of a supported cocatalyst E 5 g of the modified support described in Example 11 in 50 ml of pentane are admixed at −40° C. with 1.75 g (10 mmol) of pentafluorophenyllithium in 20 ml of diethyl ether. The suspension obtained is stirred at room temperature for 1 hour. Then 2.8 g (10 mmol) of triphenylmethylchloride are added and the mixture is stirred for six hours more. The solvent is decanted off and the support material is washed again with pentane. Then the solvent which remains is stripped off in vacuo and the support is dried in vacuo. In order to remove excess lithium chloride, the residue which remains is subjected to extraction with 50 ml of tetrahydrofuran and the extract is subsequently filtered. The residue is washed with 2×10 ml of pentane and then dried under an oil pump vacuum.

EXAMPLE 16

Preparation of the catalyst system A and polymerization

A solution of 10 mg (0.023 mmol) of dimethylsilanediylbis(2-methyl-indenyl)zirconium dimethyl in 40 ml of toluene was admixed in portions with 10 g of cocatalyst A from Example 7. The mixture was stirred at room temperature for 1 h and then the solvent was removed to constant weight under an oil pump vacuum. For introduction into the polymerization system, 10 g of the catalyst system A were resuspended in 50 ml of EXXSOL™ which is a hydrocarbon manufactured by Exxon.

Polymerization

In parallel with this, a dry 16 dm³ reactor was flushed first with nitrogen and then with propylene and charged with 10 dm³ of liquid propylene. Then 0.5 cm³ of 20% strength triisobutylaluminum solution in VARSOL™ a hydrocarbon manufactured by Exxon. diluted with 30 cm³ Of EXXSOL™ thereof, were introduced into the reactor and the batch was stirred at 30° C. for 15 minutes.

Subsequently, the catalyst suspension was placed in the reactor. The reaction mixture was heated to the polymerization temperature of 60° C. (4° C./min) and the polymerization system was maintained at 60° C. for 1 h by cooling. The polymerization was brought to an end by expelling the remainder of the propylene gas. The polymer was dried in a vacuum drying cabinet.

1.4 kg of polypropylene powder result. The reactor showed no deposits on the internal walls or stirrer. The catalyst activity was 140 kg of PP/g of metallocene×h.

EXAMPLE 17

Preparation of the catalyst system B and polymerization

A solution of 10 mg (0.023 mmol) of dimethylsilanediylbis(2-methyl-indenyl)zirconium dimethyl in 40 ml of toluene was admixed in portions with 10 g of cocatalyst B from Example 8. The mixture was stirred at room temperature for 1 h and then the solvent was removed to constant weight under an oil pump vacuum. For introduction into the polymerization system, 10 g of the catalyst system B were resuspended in 50 ml of EXXSOL™ thereof.

Polymerization

In parallel with this, a dry 16 dm³ reactor was flushed first with nitrogen and then with propylene and charged with 10 dm³ of liquid propylene. Then 0.5 cm³ of 20% strength triisobutylaluminum solution in VARSOL™ thereof, diluted with 30 cm³ of EXXSOL™ thereof, were introduced into the reactor and the batch was stirred at 30° C. for 15 minutes.

Subsequently, the catalyst suspension was placed in the reactor. The reaction mixture was heated to the polymerization temperature of 60° C. (4° C./min) and the polymerization system was maintained at 60° C. for 1 h by cooling. The polymerization was brought to an end by expelling the remainder of the propylene gas. The polymer was dried in a vacuum drying cabinet 1.1 kg of polypropylene powder result. The reactor showed no deposits on the internal walls or stirrer. The catalyst activity was 110 kg of PP/g of metallocene×h.

What is claimed is:

1. A supported chemical compound of the formula I

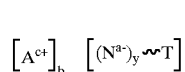

(I)

in which $A^{C+}$ is a cation, c is an integer from 1 to 2, b is an integer $\geq 0$, T is a support, y is an integer $\geq 1$, a is an integer from 0 to 10, where a·y=c·b, and N is a unit of the formula II

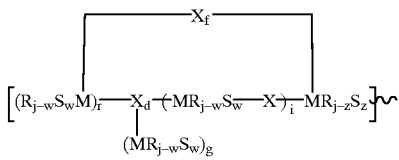

(II)

in which
R independently at each occurrence is identical or different and a halogen atom or a $C_1$–$C_{40}$ carbon-containing group
X independently at each occurrence is identical or difference and is a $C_1$–$C_{40}$ carbon-containing group
M independently at each occurrence is identical or different and is an element of group IIIa of the Periodic Table of the Elements,
d is 0 or 1,
f is 0 or 1,
g is 0 or 1,
i is 0 or 1,
j is an integer from 1 to 6,
r is 1,
w is identical or different at each occurrence and is 0, 1 or 2, and z is 0, 1 or 2,
S at each occurrence is identical or different and is a spacer which links M covalently with T,
the spacer S has the formula III

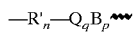 (III)

in which
R' is identical or different at each occurrence and is a $C_1$–$C_{40}$ carbon-containing group, —NR"—, —PR"—, —P(O)R"—, —Si(R")$_2$—O—Si(R")$_2$—, —C—O—SiR"$_2$— or —CONR", where R" is a $C_1$–$C_{40}$ carbon-containing group, or R' is a heteroatom-containing group,
n is an integer $\geq 0$,
Q is Si, N, P, S or O,
q is 0 or 1,
B is a substituent of Q and is NH$_2$, PH$_2$, or a $C_1$–$C_{40}$ carbon-containing group, —NR"$_2$, —COR"—, —CO$_2$R"—, —PR"$_2$, —P(O)R"$_2$, —Si(R")$_2$—O—Si(R")$_3$—, —C—O—SiR"$_3$—, CONR"$_2$, —SOR", —SO$_2$R"—, —SR", —OR", —NHR" or —PHR" where R" is a $C_1$–$C_{40}$ carbon-containing group, and
p is an integer $\geq 0$,
B can link two spacers S to one another,
~ denotes one or more covalent bonds to the support T, where in this case B is as defined for R'.

2. A catalyst system comprising a) at least one supported chemical compound as claimed in claim 1 and b) at least one transition metal compound $M^1L_x$, in which $M^1$ is a transition metal, L is a ligand and x is an integer from 1 to 6.

3. A catalyst system obtainable by combining a) at least one supported chemical compound as claimed in claim 1 and b) at least one transition metal compound $M^1L_x$, in which $M^1$ is a transition metal, L is a ligand and x is an integer from 1 to 6.

4. The catalyst system as claimed in claim 3, wherein the transition metal compound $M^1L_x$ is a metallocene.

5. A process for preparing a polyolefin by polymerizing one or more olefins in the presence of the catalyst system as claimed in claim 2.

6. A polyolefin which is prepared by the process as claimed in claim 5.

7. The supported chemical compound as claimed in claim 1, wherein
R independently at each occurrence is identical or different and is a halogen atom or a $C_1$–$C_{40}$-alkyl, $C_1$–$C_{40}$-haloalkyl, $C_6$–$C_{40}$-aryl, $C_6$–$C_{40}$-haloaryl, $C_7$–$C_{40}$-arylalkyl or $C_7$–$C_{50}$-halo-arylalkyl group, and
X independently at each occurrence is identical or different and an alkylene containing up to 40 carbon atoms, a haloalkylene containing up to 40 carbon atoms, $C_6$–$C_{40}$-arylene, $C_6$–$C_{40}$-haloarylene, $C_7$–$C_{40}$-arylalkylene, $C_7$–$C_{40}$-halo-arylalkylene, $C_2$–$C_{40}$-alkynylene, $C_2$–$C_{40}$-haloalkynylene, $C_2$–$C_{40}$-alkenylene, $C_2$–$C_{40}$-haloalkenylene group, or a trivalent carbon-containing group.

8. The supported chemical compound as claimed in claim 7, wherein z is 1 and w is identical at each occurrence and is zero.

9. The supported chemical compound as claimed in claim 8, wherein
R' is identical or different at each occurrence and is an alkylene containing up to 40 carbon atoms, $C_1$–$C_{40}$-haloalkylene, $C_6$–$C_{40}$-arylene, $C_8$–$C_{40}$-haloarylene, $C_7$–$C_{40}$-arylalkylene, $C_7$–$C_{40}$-haloarylalkylene, $C_2$–$C_{40}$-alkynylene, $C_2$–$C_{40}$-haloalkynylene, $C_2$–$C_{40}$-alkenylene, $C_2$–$C_{40}$-haloalkenylene, $C_1$–$C_{40}$aryleneoxy, $C_1$–$C_{40}$-alkylaryleneoxy or $C_1$–$C_{40}$arylalkyleneoxy group,
n is 0 or 1,
q is 0 or 1,
B is a $C_1$–$C_{40}$-alkyl, $C_1$–$C_{40}$-haloalkyl, $C_6$–$C_{40}$-aryl, $C_6$–$C_{40}$-haloaryl, $C_7$–$C_{40}$-arylalkyl, $C_7$–$C_{40}$-haloarylalkyl, $C_2$–$C_{40}$-alkynyl, $C_2$–$C_{40}$-haloalkynyl, $C_2$–$C_{40}$-alkenyl, $C_2$–$C_{40}$-haloalkenyl, $C_6$–$C_{40}$-aryloxy, $C_7$–$C_{40}$-alkylaryloxy or a $C_7$–$C_{40}$-arylalkyloxy group, and p is from 0 to 6.

10. The supported chemical compound as claimed in claim 7, wherein Q is Si and q is 1.

11. The supported chemical compound as claimed in claim 1, wherein j is 2 or 3, and
a and b are identical or different and are 0, 1 or 2.

12. The supported chemical compound as claimed in claim 7, wherein $A^{C+}$ is a carbenium, oxonium, sulfonium or a quaternary ammonium compound.

13. The supported chemical compound according to claim 12, wherein M is boron.

14. The supported chemical compound according to claim 12, wherein a is 2.

15. The supported chemical compound according to claim 1, wherein T is silica and/or alumina.

16. The method of using the supported compound as claimed in claim 1, as a catalyst component for olefin polymerization.

17. A supported chemical compound of the formula (I')

 (I')

in which
T is a support, y is an integer $\geq 1$,

N is a unit of the formula (II')

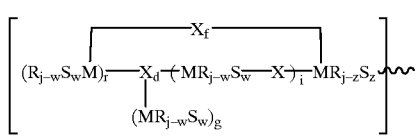

(II')

in which

R independently at each occurrence is identical or different and a halogen atom or a $C_1$–$C_{40}$ carbon-containing group, X independently at each occurrence is identical or different and is a $C_1$–$C_{40}$ carbon-containing group, M independently at each occurrence is identical or different and is an element of group IIa, IIIa, IVa or Va of the Periodic Table of the Elements, d is 0 or 1, f is 0 or 1, g is 0 or 1, r is 0 or 1, i is 0 or 1, j is an integer from 1 to 6, w is identical or different at each occurrence and is 0, 1 or 2, and z is 0, 1 or 2, S at each occurrence is identical or different and is a spacer which links M covalently with T, the spacer S has the formula (III)

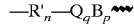

(III)

in which

R is identical or different at each occurrence and is a $C_1$–$C_{40}$ carbon-containing group, —NR"—, —PR"—, —P(O)R"—, —Si(R")$_2$—, —O—Si(R")$_2$—, —C—O—SiR"$_2$— or —CONR"—, where R" is a $C_1$–$C_{40}$ carbon-containing group, or R' is a heteroatom-containing group, n is an integer $\geq 0$, Q is Si, N, P, S or O q is 0 or 1, B is a substituent of Q and is NH$_2$, PH$_2$ or a $C_1$–$C_{40}$ carbon-containing group, —NR"$_2$, —COR"—, —CO$_2$R"—, —PR"$_2$, —P(O)R"$_2$, —Si(R")$_2$—, —O—Si(R")$_3$—, —C—O—SiR")$_3$—, —CONR"$_2$, —SOR"; —SO$_2$R"—, —SR", —OR", —NHR" or —PHR" where R" is a $C_1$–$C_{40}$ carbon-containing group, and p is an integer $\geq 0$, B can link two spacers S to one another, ~~~ denotes one or more covalent bonds to the support T, where in this case B is as defined for R'.

18. The supported chemical compound as claimed in claim 17, in which M is an element of group IIIa of the Periodic Table of the Elements.

19. The supported chemical compound according to claim 18, wherein M is boron.

20. The supported chemical compound according to claim 17, wherein T is silica and/or alumina.

21. The supported chemical compound according to claim 17, wherein X independently at each occurrence is identical or different and is an alkylene containing up to 40 carbon atoms, a haloalkylene containing up to 40 carbon atoms, $C_6$–$C_{40}$-arylene, $C_6$–$C_{40}$-haloarylene, $C_7$–$C_{40}$-arylalkylene, $C_7$–$C_{40}$-halo-arylalkylene, $C_2$–$C_{40}$-alkynylene, $C_2$–$C_{40}$-haloalkynylene, $C_2$–$C_{40}$-alkenylene, $C_2$–$C_{40}$-haloalkenylene group, $C_1$–$C_{40}$-alkanetriyl, $C_1$–$C_{40}$-haloalkanetriyl, $C_6$–$C_{40}$-arenetniyl, $C_6$–$C_{40}$-haloarenetriyl, $C_7$–$C_{40}$-arenalkanetriyl, $C_7$–$C_{40}$-haloarenealkanetriyl, $C_2$–$C_{40}$-alkynetriyl, $C_2$–$C_{40}$-haloalkynetriyl, $C_2$–$C_{40}$-alkenetriyl or $C_2$–$C_{40}$-haloalkenetriyl group.

* * * * *

UNITED STATES PATENT AND TRADEMARK OFFICE
CERTIFICATE OF CORRECTION

PATENT NO. : 6,329,313 B1
DATED : December 11, 2001
INVENTOR(S) : Fritze et al.

It is certified that error appears in the above-identified patent and that said Letters Patent is hereby corrected as shown below:

Title page,
ABSTRACT, 20 lines after formula (II), at approximately line 15, "different substituent of $M_1$ such as..." should read as -- different substituent of M, such as... --
At approximately line 32, "..., $C_2$-$C_{40}$haloalkynetriyl..." should read as -- "..., $C_2$-$C_{40}$-haloalkynetriyl... --

Column 31, claim 17,
Line 37, "R is identical..." should read as -- R' is identical... --

Column 32, claim 18,
Line 19, "...of group IIia of the" should read as -- ...of group IIIa of the --

Column 32, claim 21,
Line 34, "...,$C_6$-$C_{40}$-arenetniyl,..." should read as -- ..., $C_6$-$C_{40}$-arenetriyl,... --

Signed and Sealed this

Sixteenth Day of April, 2002

*Attest:*

JAMES E. ROGAN
*Director of the United States Patent and Trademark Office*

*Attesting Officer*